US011859973B2

(12) United States Patent
Liu

(10) Patent No.: US 11,859,973 B2
(45) Date of Patent: *Jan. 2, 2024

(54) LARGE SCALE CNN REGRESSION BASED LOCALIZATION VIA TWO-DIMENSIONAL MAP

(71) Applicant: Intel Corporation, Santa Clara, CA (US)

(72) Inventor: Zhongxuan Liu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,583

(22) Filed: Sep. 3, 2021

(65) Prior Publication Data

US 2022/0058828 A1 Feb. 24, 2022

Related U.S. Application Data

(63) Continuation of application No. 16/468,282, filed as application No. PCT/CN2016/111311 on Dec. 21, 2016, now Pat. No. 11,132,816.

(51) Int. Cl.
*G01C 21/20* (2006.01)
*G06T 7/55* (2017.01)
(Continued)

(52) U.S. Cl.
CPC ........... *G01C 21/206* (2013.01); *G06F 17/15* (2013.01); *G06F 17/16* (2013.01); *G06N 3/047* (2023.01);
(Continued)

(58) Field of Classification Search
CPC . G06T 2207/20081; G06T 2207/20084; G06T 7/11; G06T 7/0012; G06T 19/006;
(Continued)

(56) References Cited

U.S. PATENT DOCUMENTS

2012/0271624 A1 10/2012 Chen et al.
2014/0037136 A1* 2/2014 Ramalingam ............ G06T 7/73
382/103

(Continued)

FOREIGN PATENT DOCUMENTS

CN 103247225 A 8/2013
CN 104236548 A 12/2014
(Continued)

OTHER PUBLICATIONS

International Search Report and Written Opinion for PCT Patent Application No. PCT/CN2016/111311, dated Sep. 25, 2017, 9 pages.

(Continued)

*Primary Examiner* — Ajibola A Akinyemi
(74) *Attorney, Agent, or Firm* — Compass IP Law PC

(57) ABSTRACT

Embodiments described herein provide a processing apparatus comprising compute logic to train a convolutional neural network (CNN) to perform autonomous re-localization for a service robot or mobile device. In one embodiment the apparatus comprises an image processor to process visual data received via a sensor and a general purpose graphics processing engine perform camera pose estimation for image data and generate a transformation matrix to transform positions of camera pose estimations to positions within a human readable map of the location. The images and transformed positions are uses to train the CNN to perform re-localization.

22 Claims, 22 Drawing Sheets

(51) Int. Cl.
*G06T 7/73* (2017.01)
*G06F 17/15* (2006.01)
*G06F 17/16* (2006.01)
*G06N 3/08* (2023.01)
*G06T 17/00* (2006.01)
*G06N 3/047* (2023.01)
*G06V 10/764* (2022.01)
*G06V 10/82* (2022.01)
*G06V 20/10* (2022.01)

(52) U.S. Cl.
CPC .................. *G06N 3/08* (2013.01); *G06T 7/55* (2017.01); *G06T 7/75* (2017.01); *G06T 17/00* (2013.01); *G06V 10/764* (2022.01); *G06V 10/82* (2022.01); *G06V 20/10* (2022.01); *G06T 2207/20081* (2013.01); *G06T 2207/20084* (2013.01); *G06T 2207/30244* (2013.01)

(58) Field of Classification Search
CPC ......... G06T 2207/20076; G06T 7/0002; G06T 7/174; G06T 11/60; G06T 19/20; G06T 2200/04; G06T 2207/20221; G06T 2207/30024; G06T 7/0014; G06T 7/70
USPC .......................................................... 382/154
See application file for complete search history.

(56) References Cited

U.S. PATENT DOCUMENTS

2015/0279113 A1* 10/2015 Knorr ................... G06T 19/006
  345/633
2017/0294010 A1* 10/2017 Shen ........................ G06N 3/08

FOREIGN PATENT DOCUMENTS

| CN | 105144196 A | 12/2015 |
| CN | 105678689 A | 6/2016 |
| CN | 105913489 A | 8/2016 |

OTHER PUBLICATIONS

Notice of Allowance for U.S. Appl. No. 16/468,282, dated Feb. 4, 2021, 9 pages.
Notice of Allowance for U.S. Appl. No. 16/468,282, dated May 13, 2021, 9 pages.
Chinese Translation of P.R. China State Intellectual Property Office First Office Action for Patent Application No. 201680091003.8, dated Nov. 25, 2022, 5 pages.

\* cited by examiner

LARGE SCALE CNN REGRESSION BASED LOCALIZATION VIA TWO-DIMENSIONAL MAP

CROSS-REFERENCE TO RELATED APPLICATIONS

This patent application is a continuation of U.S. patent application Ser. No. 16/468,282, filed Jun. 11, 2019, entitled "LARGE SCALE CNN REGRESSION BASED LOCALIZATION VIA TWO-DIMENSIONAL MAP", which claims priority to U.S. National Phase application under 35 U.S.C. § 371 of International Application No. PCT/CN2016/111311, filed Dec. 21, 2016, entitled "LARGE SCALE CNN REGRESSION BASED LOCALIZATION VIA TWO-DIMENSIONAL MAP". The entire specifications of which are hereby incorporated herein by reference in their entirety.

TECHNICAL FIELD

Embodiments generally relate to logic to perform computer vision and localization operations using general purpose graphics processing units. More particularly, embodiments relate to large scale CNN regression based localization and re-localization.

BACKGROUND

A neural network can be modeled as collections of neurons that are connected in an acyclic graph. A neural network can receive an input (a single vector), and transform it through a series of hidden layers. Each hidden layer is made up of a set of neurons, where each neuron is fully connected to all neurons in the previous layer, and where neurons in a single layer function completely independently and do not share any connections. The last layer is called the "output layer." In classification settings the output represents a classification score, while in a regression setting the output is a prediction of continuous values that is performed based on previously performed training operations. A convolutional neural network (CNN) is similar to a standard neural network. A CNN, however, is explicitly tailored to handle input image data.

A CNN based techniques can be used to perform camera re-localization, which is an important function for service robot navigation. The re-localization process is performed, for example, when a service robot or another computer vision enabled system is enabled and finds itself in an unknown location that is inconsistent with its previously maintained location data. For example, the robot experienced a power failure or maintenance event and has been moved while its computer vision or location-tracking system is offline. The re-localization process can include enumerating all hypothetical positions at which the robot might be located, which involves performing a determination of known locations that are consistent with current sensor input. The robot can then explore its immediate environment and, using sensor data, attempt to determine a more precise location that is consistent with previously determined location data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
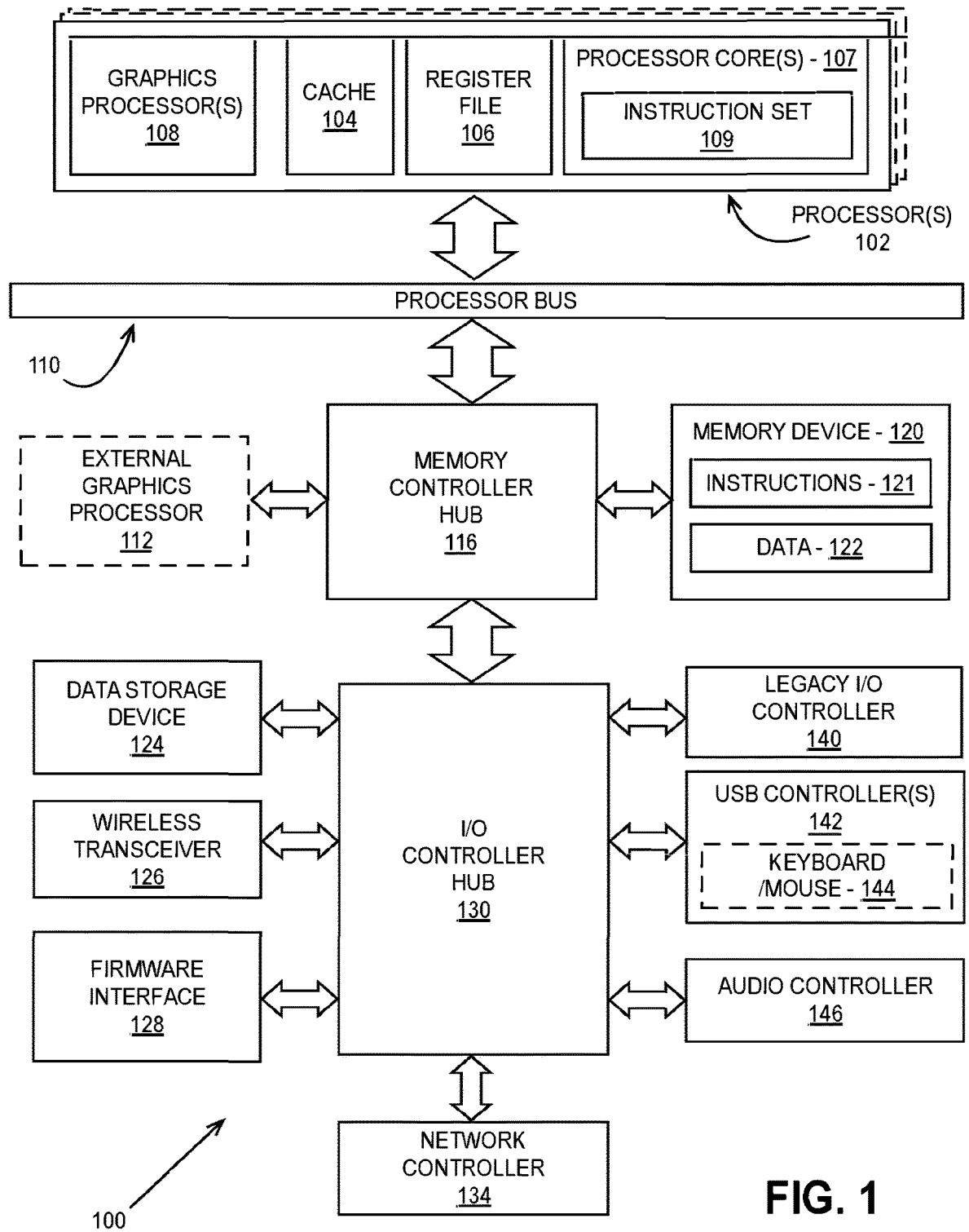
FIG. 1 is a block diagram of an embodiment of a computer system with a processor having one or more processor cores and graphics processors.

CNN regression is a technique that can enable fine-grained global localization and can be used to computer vision system re-localization. Typically the training data of CNN regression is obtained via a visual simultaneous localization and mapping (VSLAM) technique. However CNN regression based re-localization using VSLAM are not as effective for use in mapping large-scale structures. First, buildings are normally divided into different parts segmented by "tunnels" (e.g., long corridors with single color walls), which provide limited visual information. The limited visual input makes the use of VSLAM more difficult. Second, even with sufficient visual information, the VSLAM optimization for large areas is time consuming and memory intensive. Third, the drift error in VSLAM can produce degraded results. Fourth, the large amount of glass in modern buildings can damage the results generated via VSLAM. Furthermore, the coordinate system of VLAM differs from human used maps. Therefore, humans cannot easily use the localization results produces for robots.

The techniques described herein resolve the above problems and provides a method of CNN regression based re-localization that is suitable for use in large-scale buildings. The techniques described herein are also favorable comparable to other localization methods such as Lidar, ultra wide band (UWB), Wi-Fi, and internal measurement unit (IMU) localization. The techniques described herein are lower cost and have a higher re-localization call back rate relative to Lidar, have a lower drift error relative to IMU, and does not require the installation of new instruments, as in UWB and Wi-Fi.

In one embodiment, CNN regression for interior localization within large-scale structures is performed as follows. First, the interior of a large-scale structure is divided into multiple parts. Next, sufficient visual data of the interior of the structure is gathered to enable camera pose estimation via VSLAM. A point cloud of each part is constructed and matched to a two-dimensional (2D) map. The estimated camera poses associated with the visual data of the structure is transformed into coordinates in the 2D map. CNN regression can then be trained using pairs of visual and camera pose data. The CNN regression can then be used to predict coordinates of newly captured visual data within the 2D map. In addition to service robot re-localization, these techniques have direct application for real time localization, autonomous navigation, and to enhance navigation and localization functionality for mobile device users. For example, re-localization techniques described herein can be used to enable indoor positioning to assist human navigation.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

In the description that follows, FIGS. 1-14 provide an overview of exemplary data processing system and graphics processor logic that incorporates or relates to the various embodiments. FIGS. 15-21 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
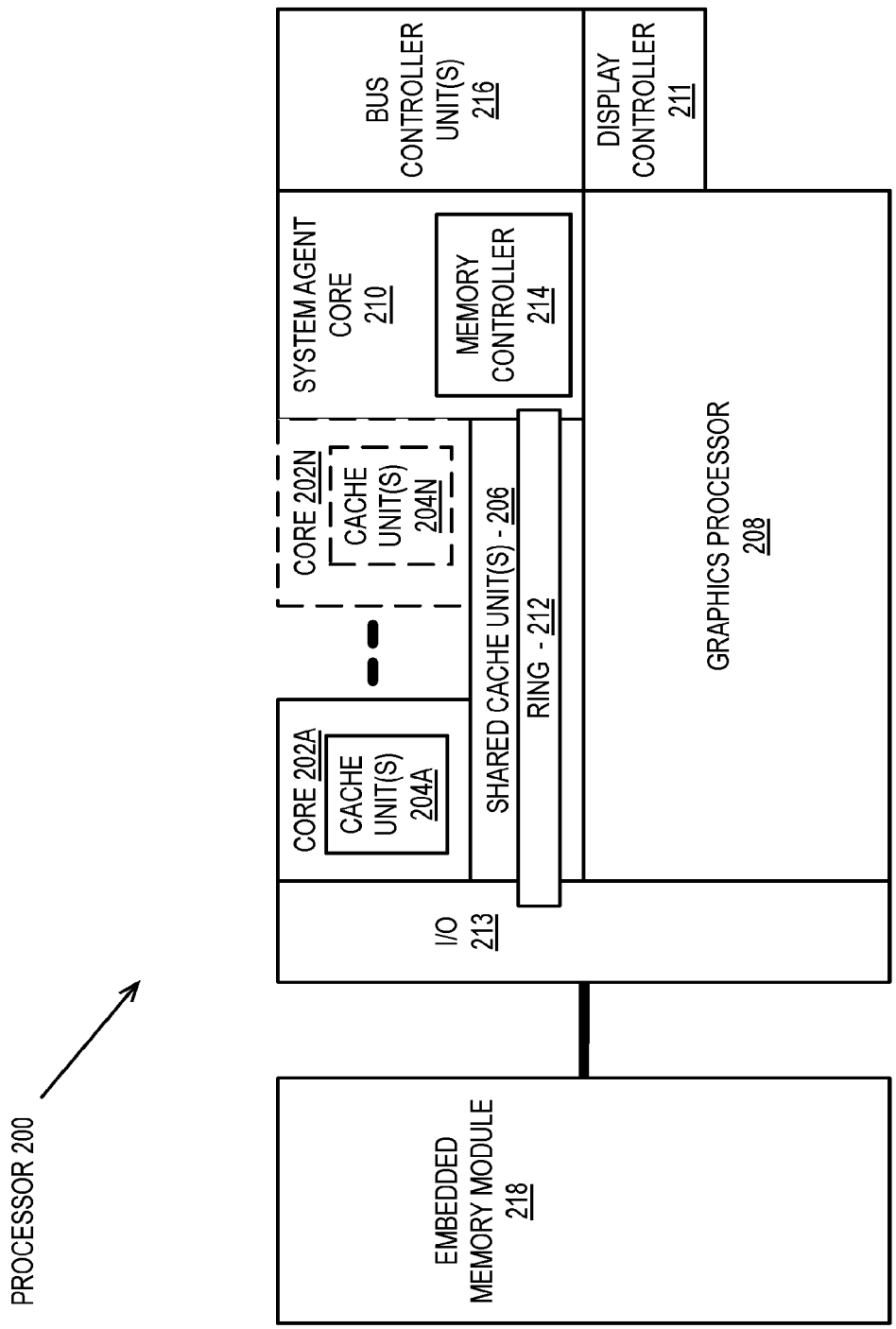
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
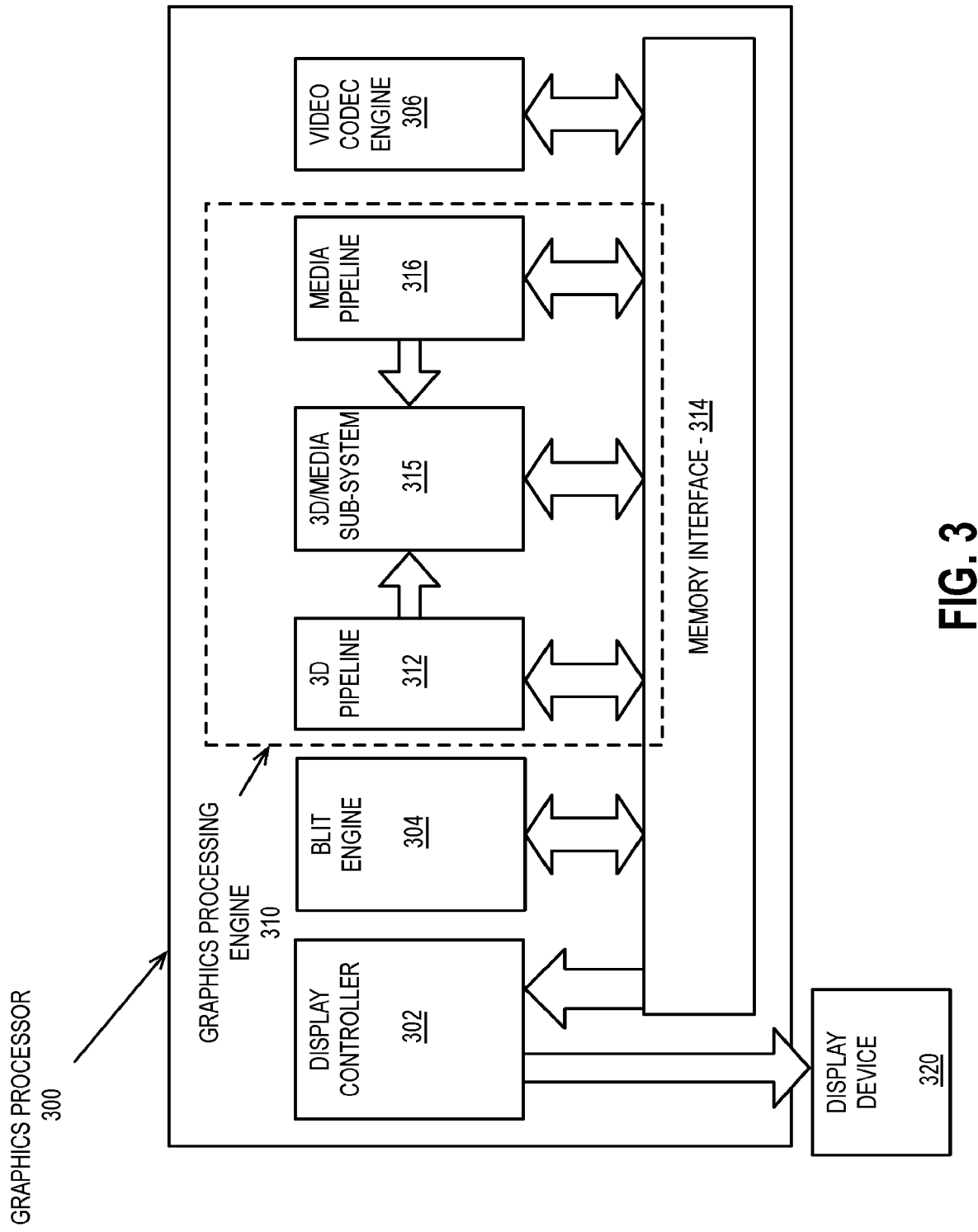
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
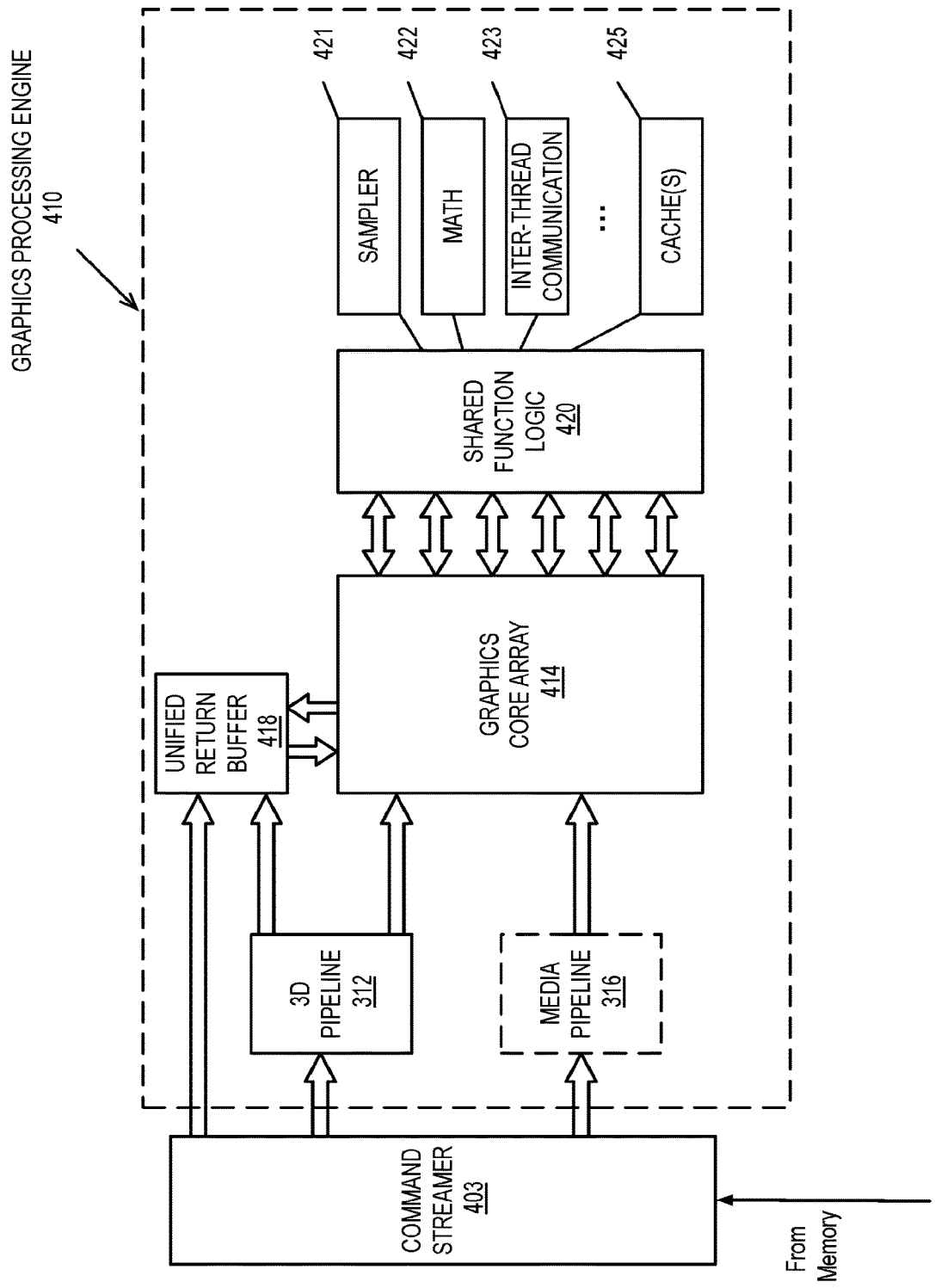
FIG. 4 is a block diagram of an embodiment of a graphics processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
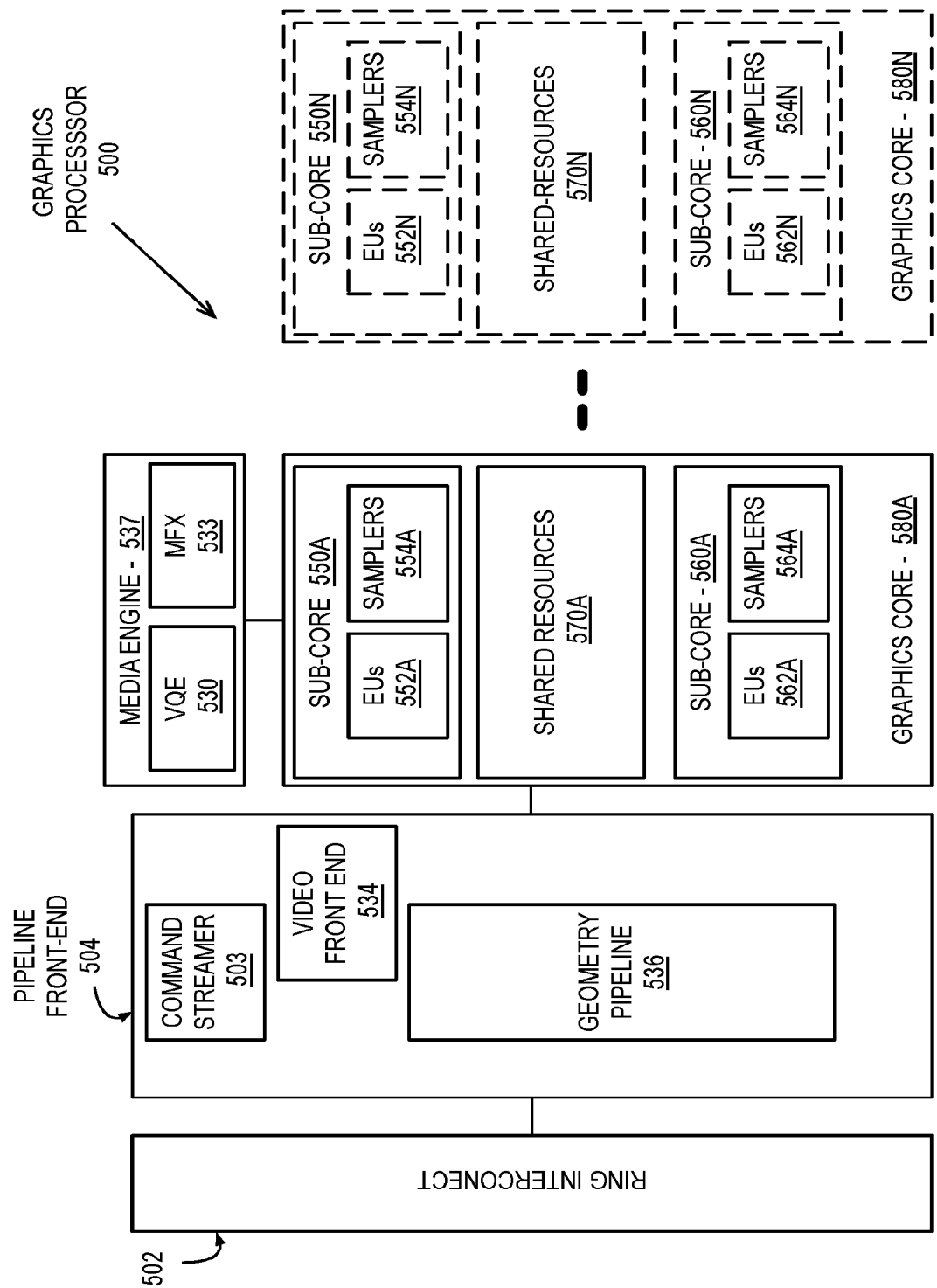
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
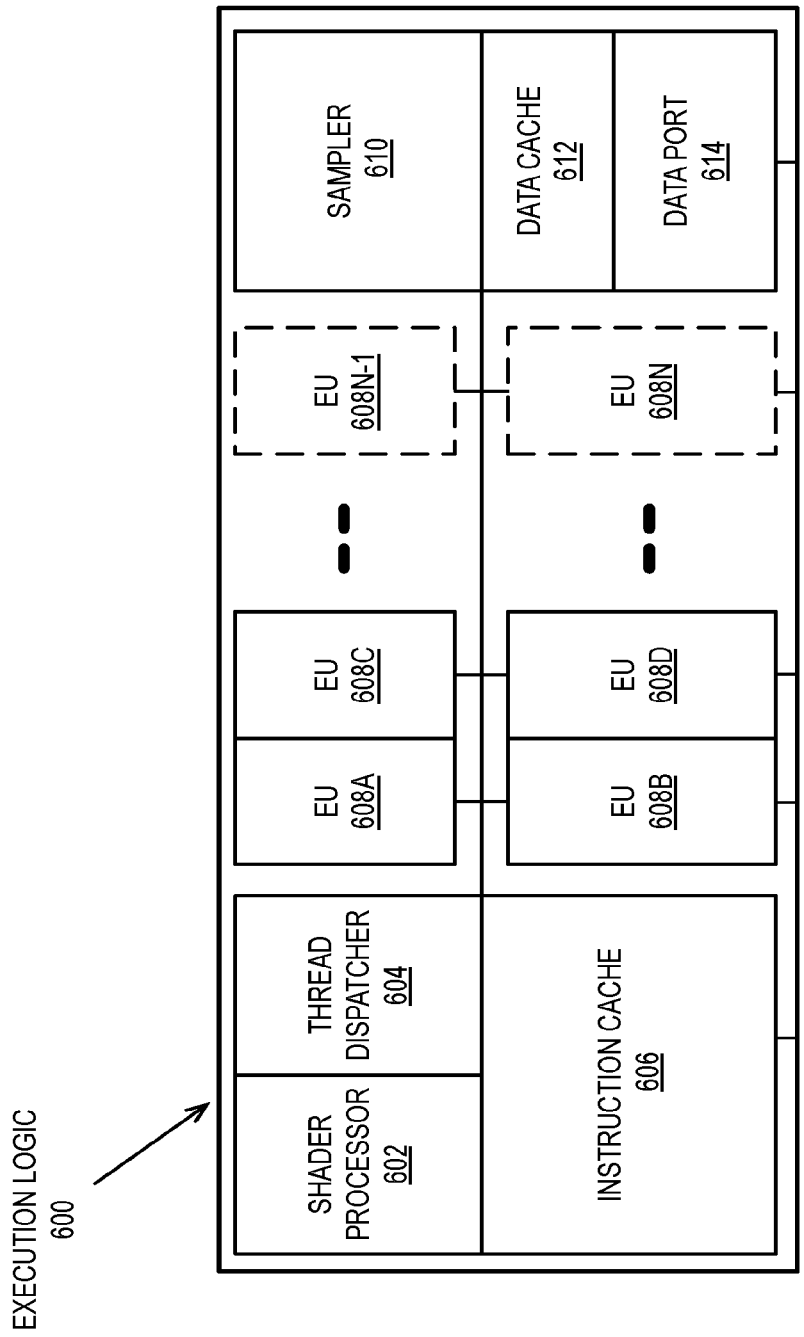
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) or single instruction multiple thread (SIMT) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
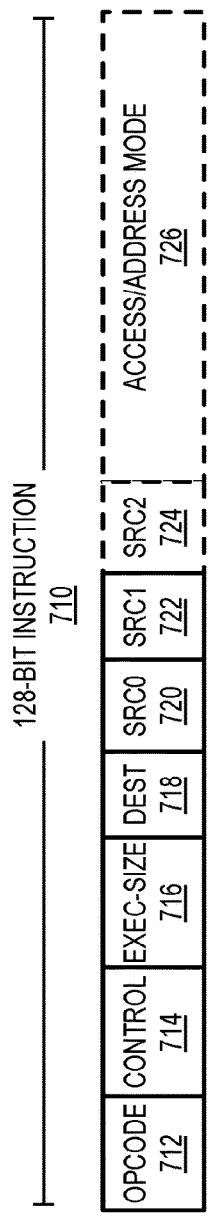
FIG. 7 illustrates a graphics processor execution unit instruction format according to an embodiment.
Figure 7:
Figure 7:
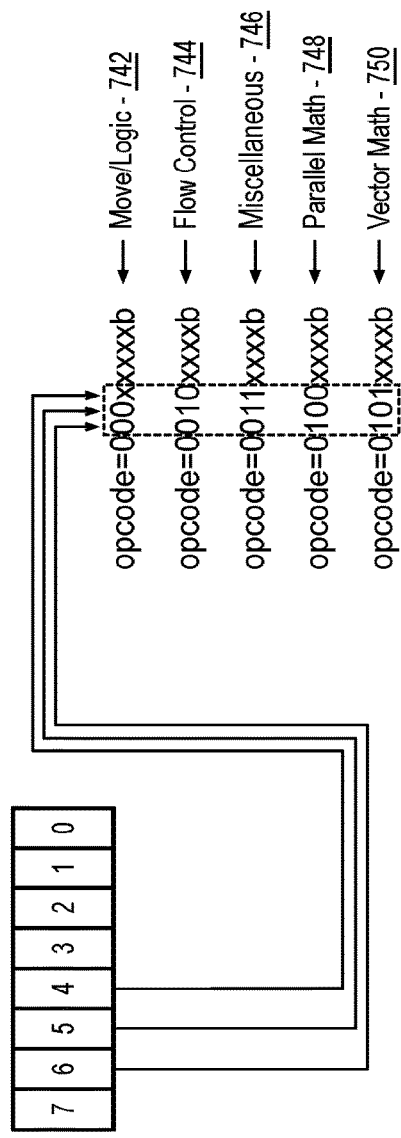

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
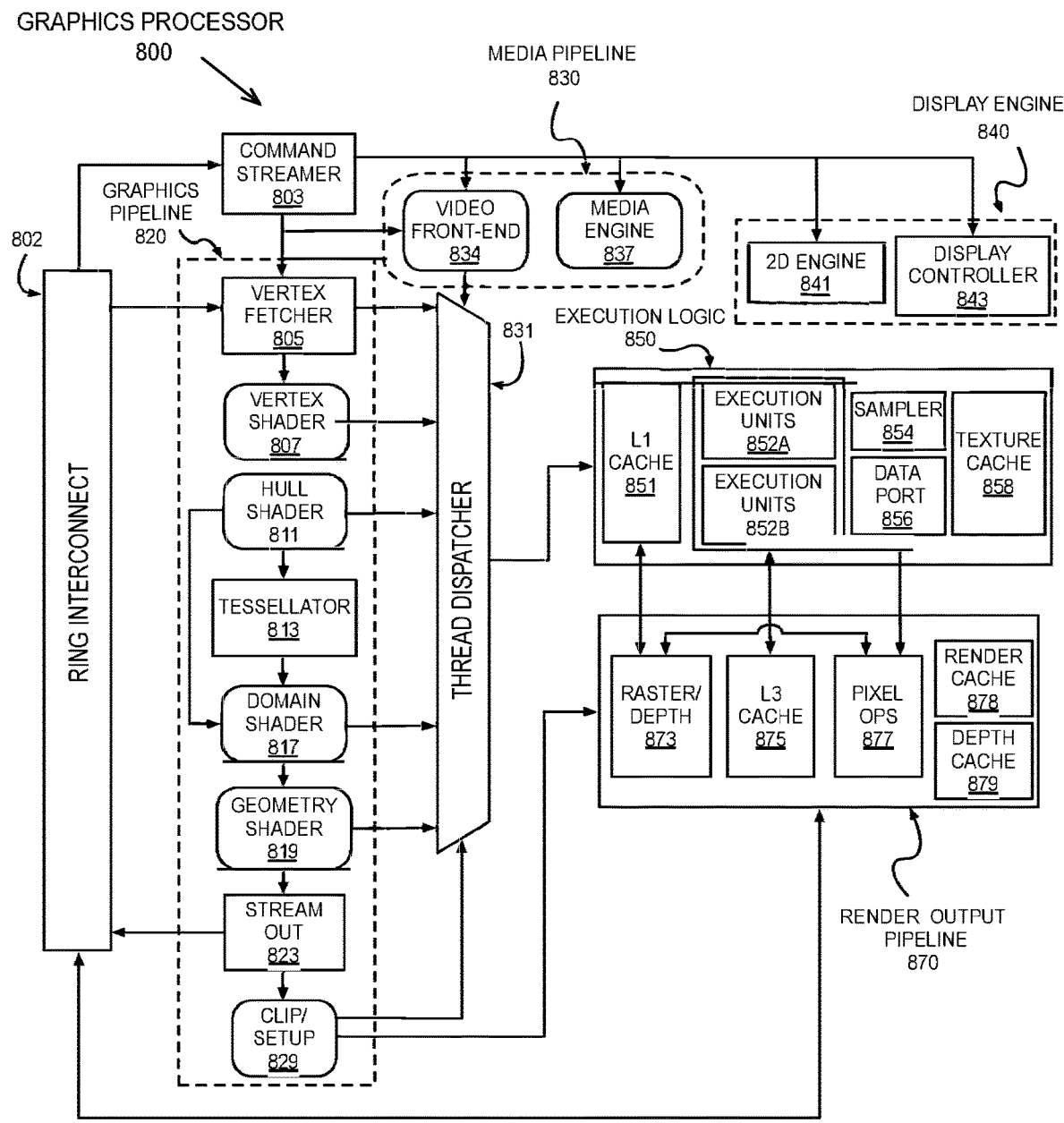
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass rasterization and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
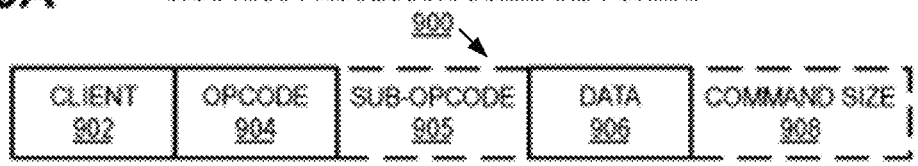
FIG. 9A is a block diagram illustrating a graphics processor command format according to an embodiment.
Figure 9B:
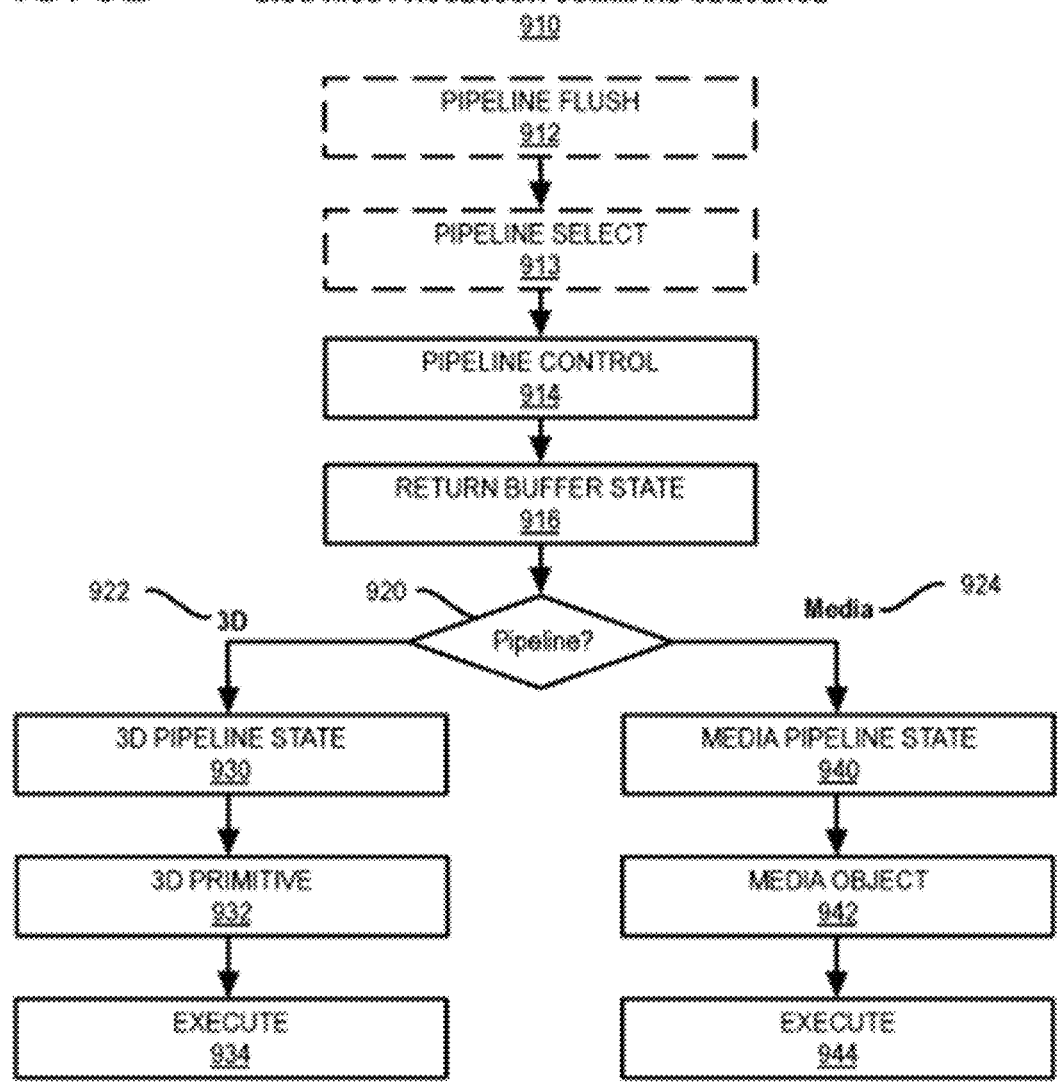
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands The exemplary graphics processor command format 900 of FIG. 9A includes data fields to identify a target client 902 of the command, a command operation code (opcode) 904, and the relevant data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
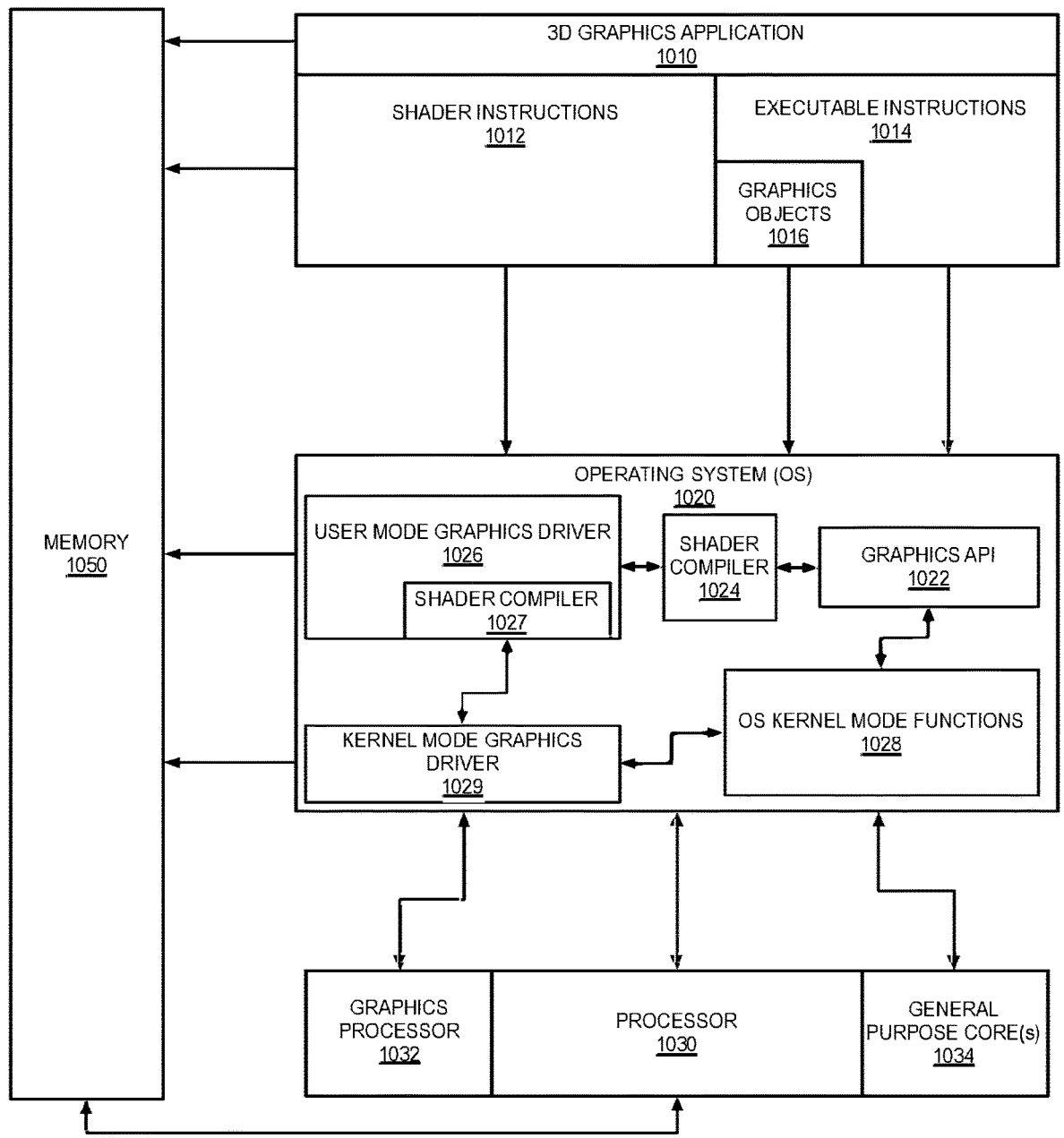
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
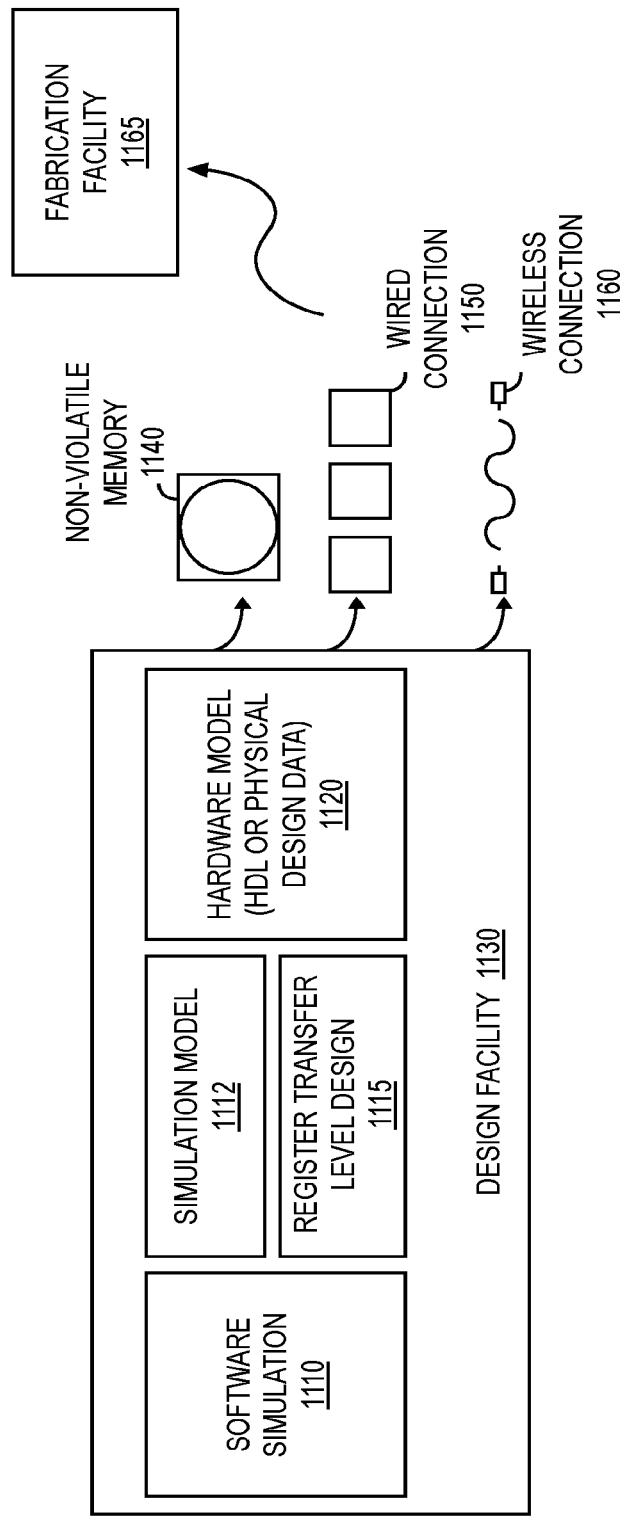
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
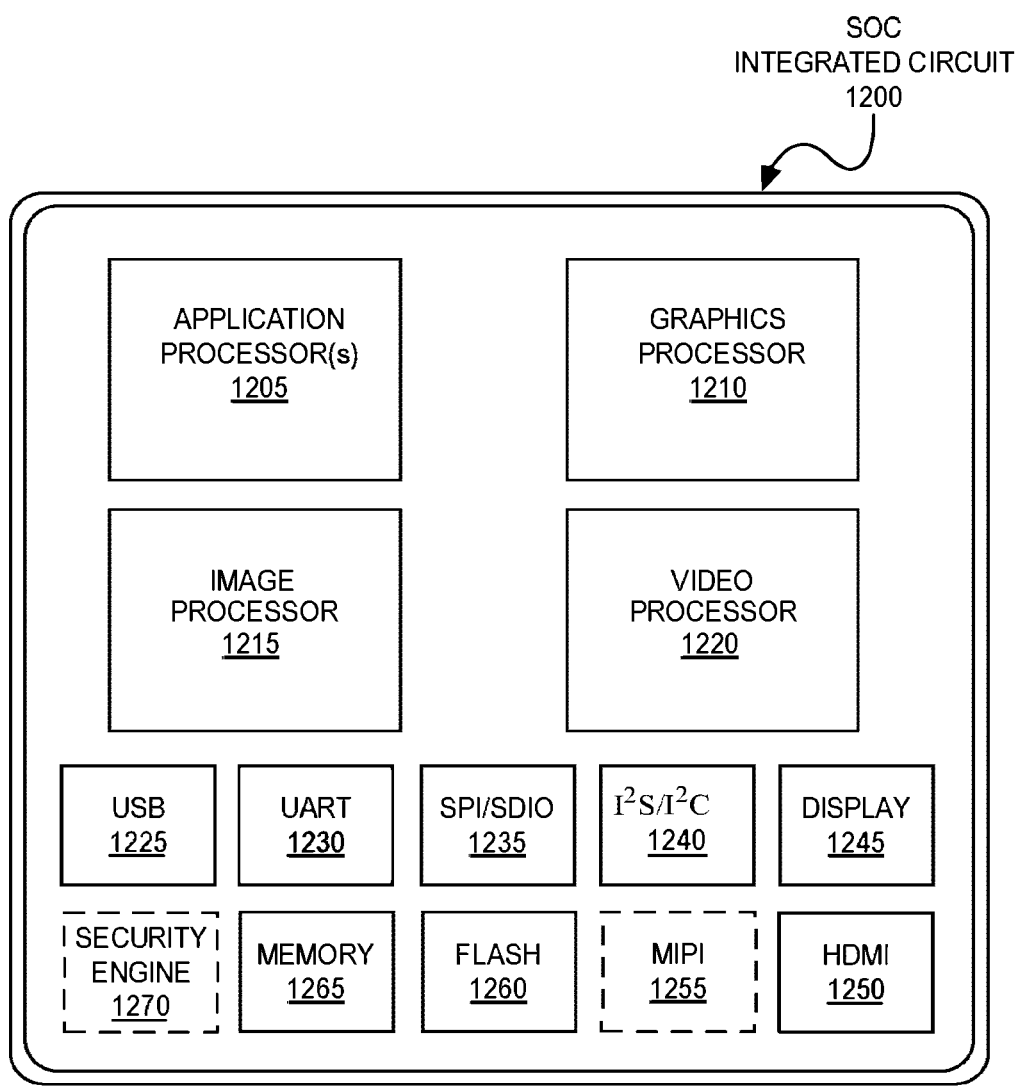
FIG. 12 is a block diagram illustrating an exemplary system on a chip integrated circuit that may be fabricated using one or more IP cores, according to an embodiment.
Figure 13:
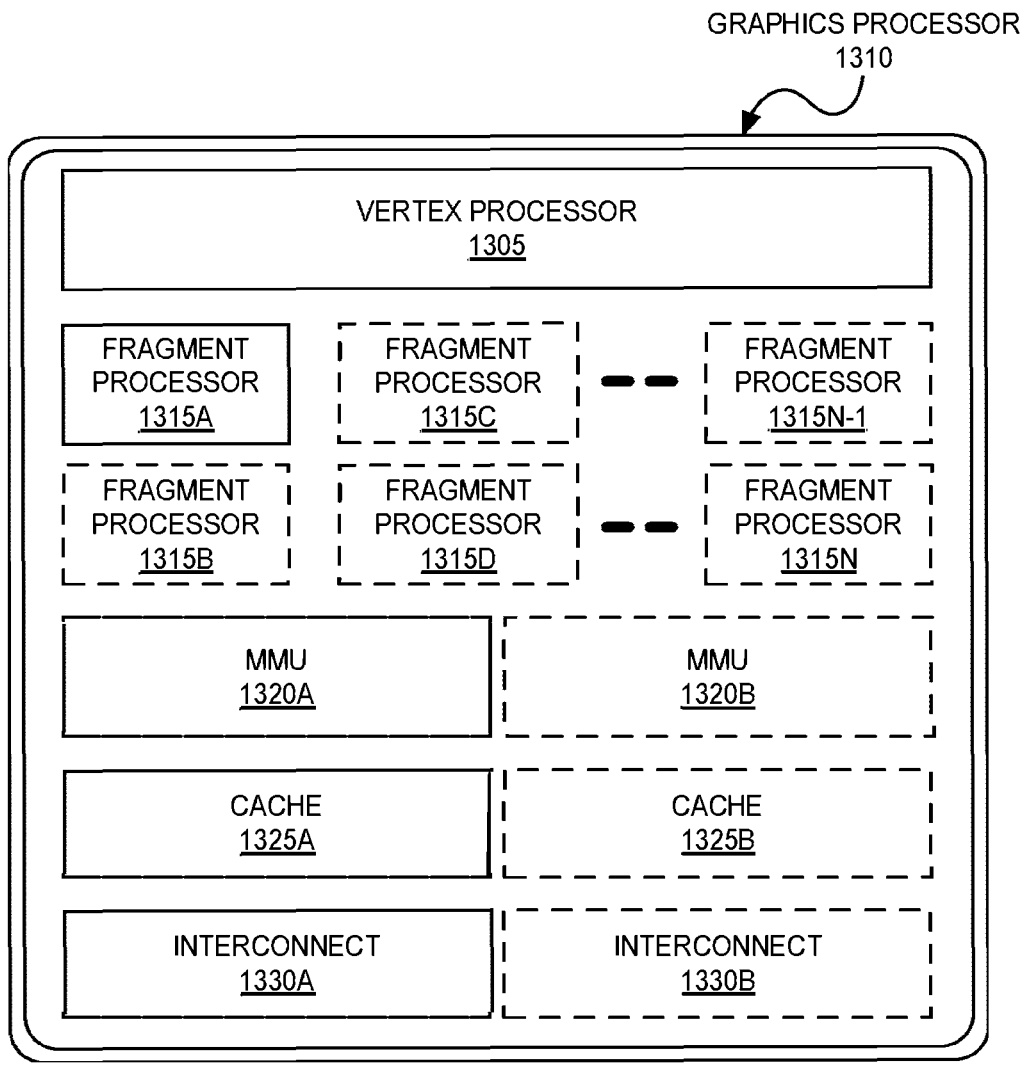
FIG. 13 is a block diagram illustrating an exemplary graphics processor of a system on a chip integrated circuit.
Figure 14:
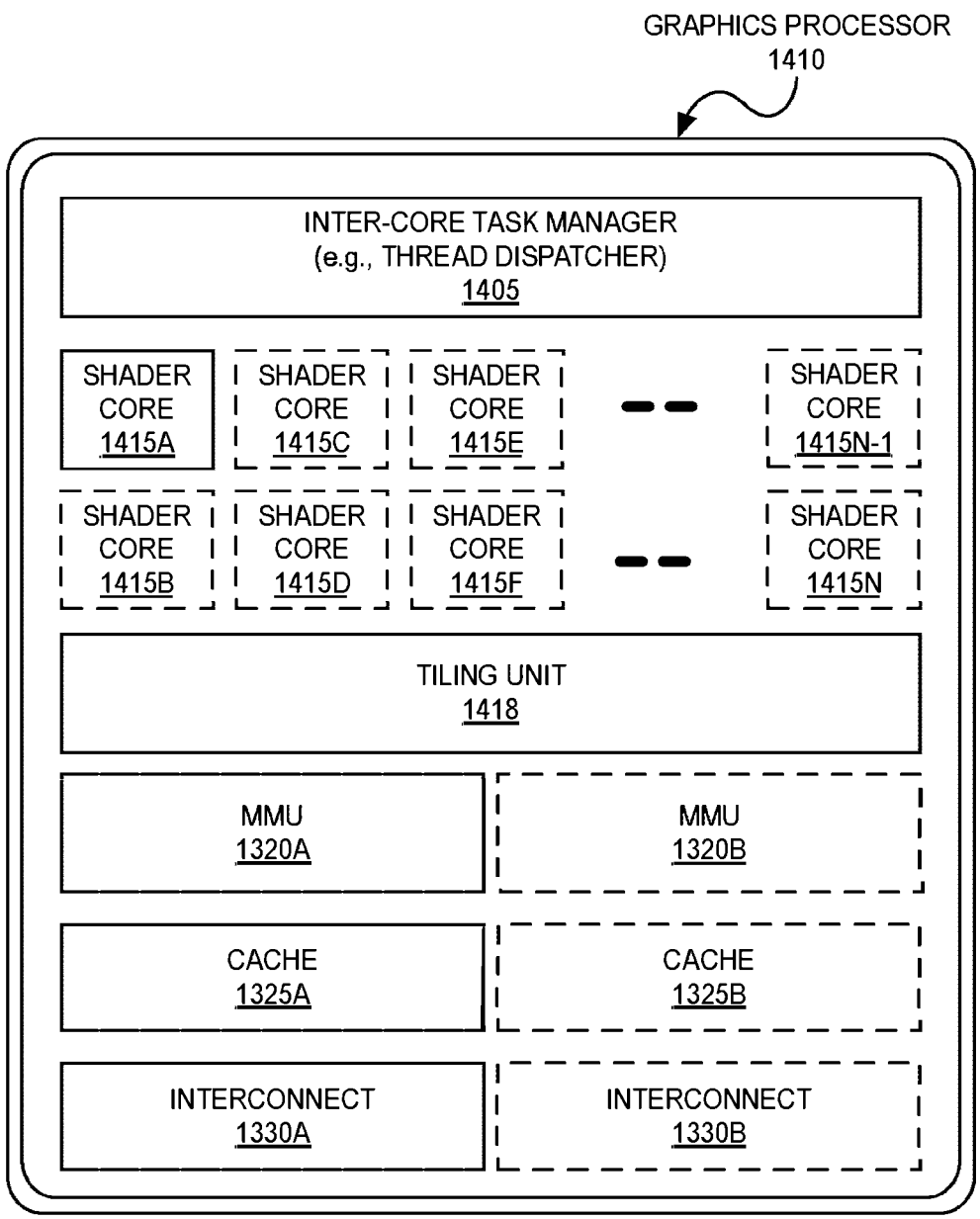
FIG. 14 is a block diagram illustrating an additional exemplary graphics processor of a system on a chip integrated circuit.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N. Graphics processor 1410 additionally includes a tiling unit 1418 to accelerate tiling operations for tile-based rendering, in which rendering operations for a scene are subdivided in image space. Tile-based rendering can be used to exploit local spatial coherence within a scene or to optimize use of internal caches.

Large Scale CNN Regression Based Localization Via Two-Dimensional Map

Embodiments described herein provide techniques to enable CNN regression for interior localization within large-scale structures. The techniques described herein resolve several issues with existing SLAM-based re-localization techniques and provide a method of CNN regression based re-localization that is suitable for use in large-scale buildings. The techniques described herein are also favorable comparable to other localization methods such as Lidar, ultra wide band (UWB), Wi-Fi, and internal measurement unit (IMU) localization. The techniques described herein are lower cost and have a higher re-localization call back rate relative to Lidar, have a lower drift error relative to IMU, and does not require the installation of new instruments, as in UWB and Wi-Fi. In addition to service robot re-localization, these techniques have direct application for real time localization, autonomous navigation, and to enhance navigation and localization functionality for mobile device users.

Figure 15:
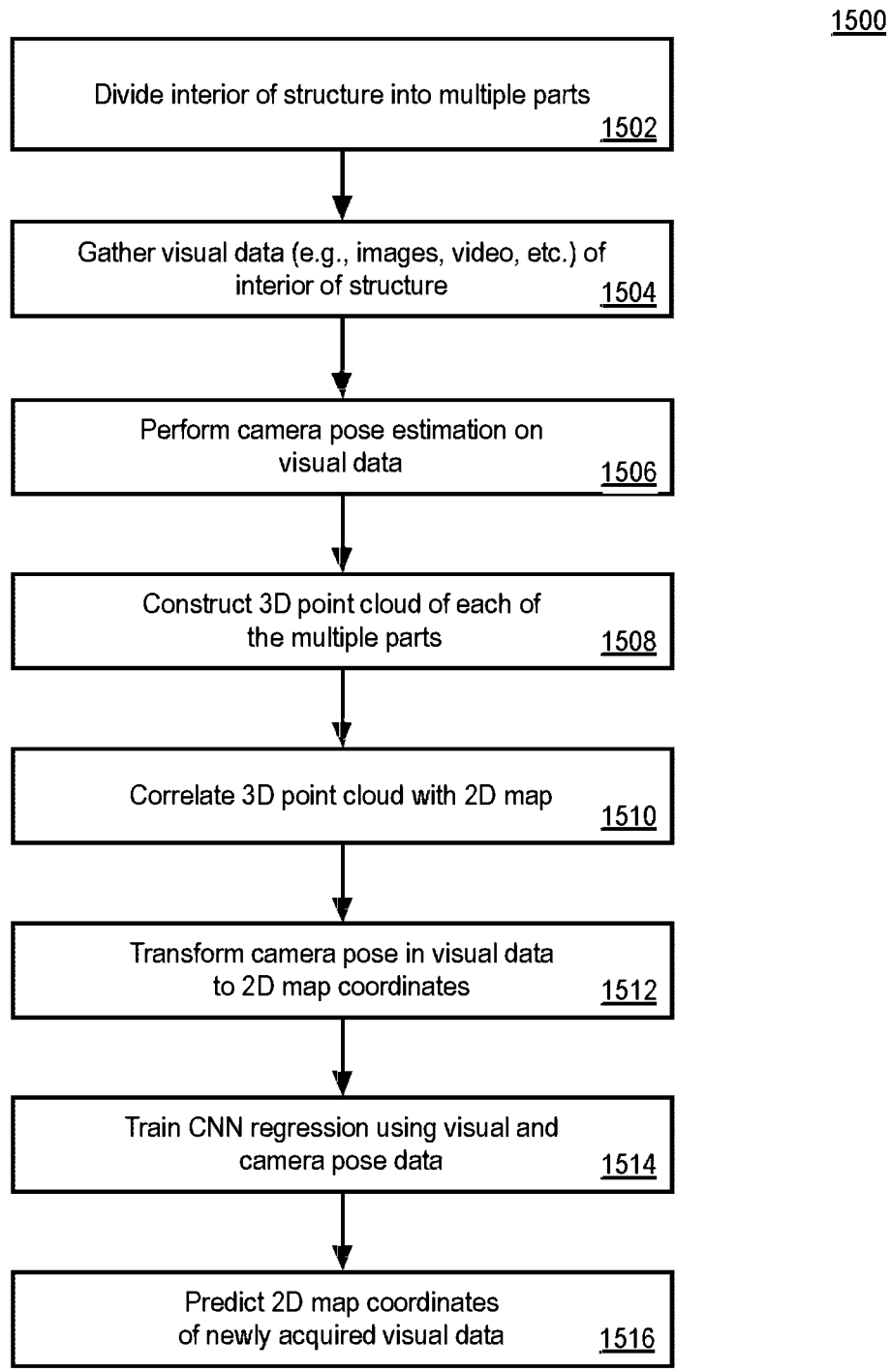
FIG. 15 is a flow diagram illustrating logic for performing CNN regression re-localization for large structures, according to an embodiment.
Figure 17:
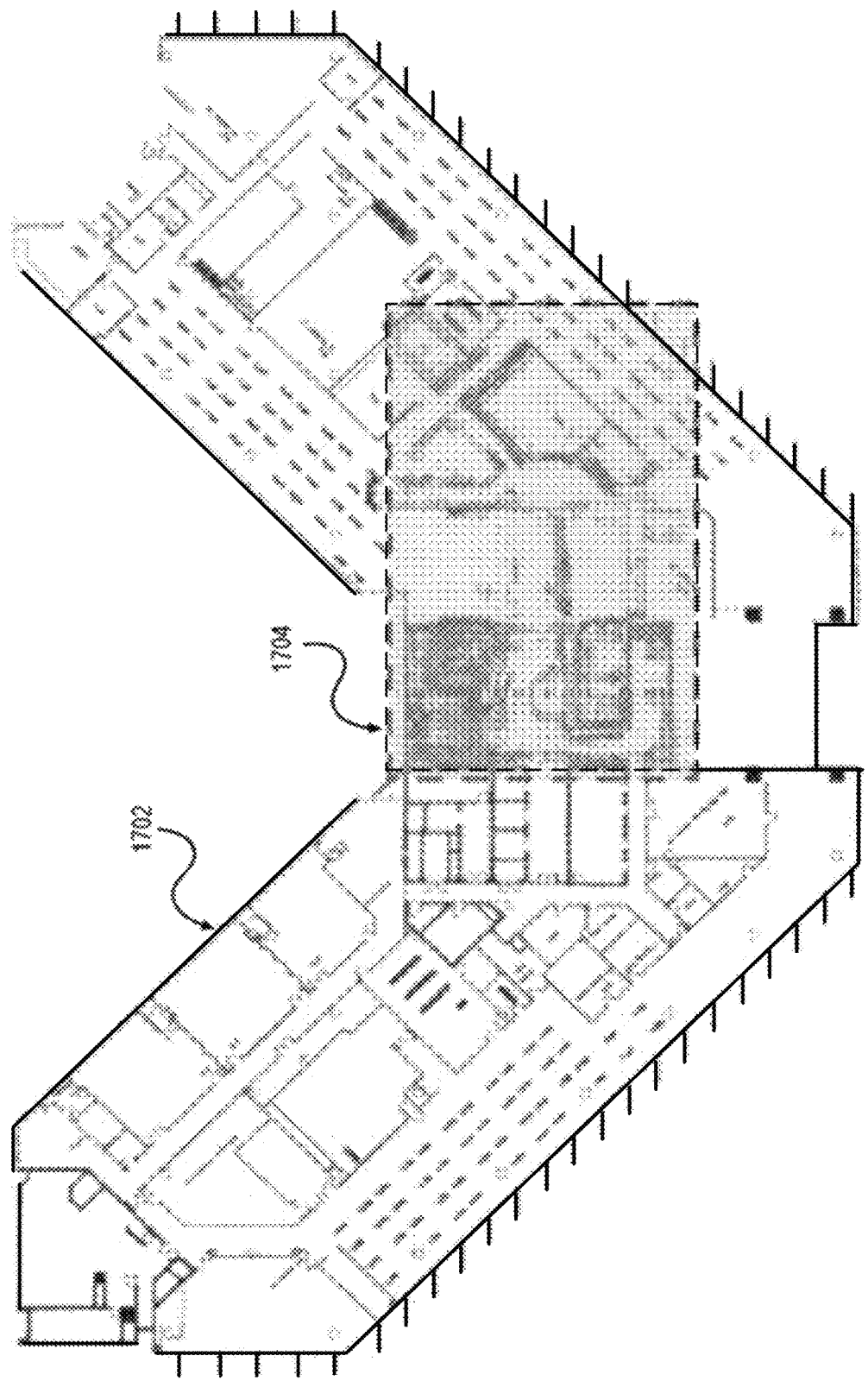
FIG. 17 illustrates segmentation of the interior of a large structure, according to an embodiment.

FIG. 15 is a flow diagram of logic 1500 to perform localization within the interior of a large-scale structure, according to an embodiment. In one embodiment, the logic 1500 can perform localization using CNN-based regression analysis. To acquire training data for the CNN model, the logic 1500 can divide the interior of the large-scale structure into multiple parts, as shown at 1502. Dividing the structure into multiple parts is illustrated in FIG. 17, in which the interior of a large structure 1702 is segmented into multiple parts, with a single one of the parts 1704 illustrated surrounded by a dotted line. The logic 1500 can then gather visual data of the interior of the structure, as shown at 1504. In one embodiment the visual data is image data that is gathered via a camera on a robot as the robot traverses the building. In one embodiment the visual data is video data that is gathered by a camera and de-constructed into multiple images. The image data (e.g., image, video, etc.) can be used to perform camera pose estimation, as shown at 1506. Camera pose estimation data includes a physical position of a camera within the structure, as well as the pose (e.g., orientation) of the camera. The camera pose can be estimated in multiple degrees of freedom. In one embodiment, six degree-of-freedom (6-DoF) camera pose estimation is used. In some embodiments, VSLAM techniques are used to perform camera pose estimation, although embodiments are not limited to any particular camera pose estimation algorithm, technique, or system. In one embodiment the VSLAM technique used for camera pose estimation is a variant of the Visual Simultaneous Localization and Mapping (vSLAM™) system from Evolution Robotics, but embodiments are not limited to any specific system or algorithm. The VSLAM camera pose estimation makes use of visual data, camera pose data, and robot location or odometer data, to determine a camera pose based on input visual data, such as an RGB based photograph. However, the VSLAM data alone is insufficient to train the CNN regression model for proper re-localization.

Figure 18:
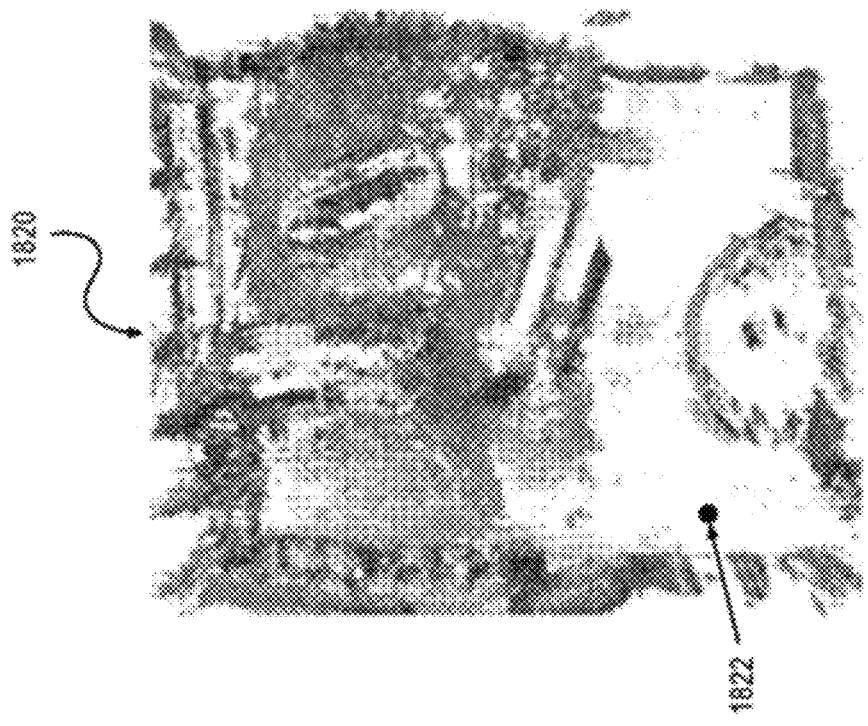
FIG. 18 illustrates an example 2D mapping and 3D point cloud mapping, according to an embodiment.
Figure 18:
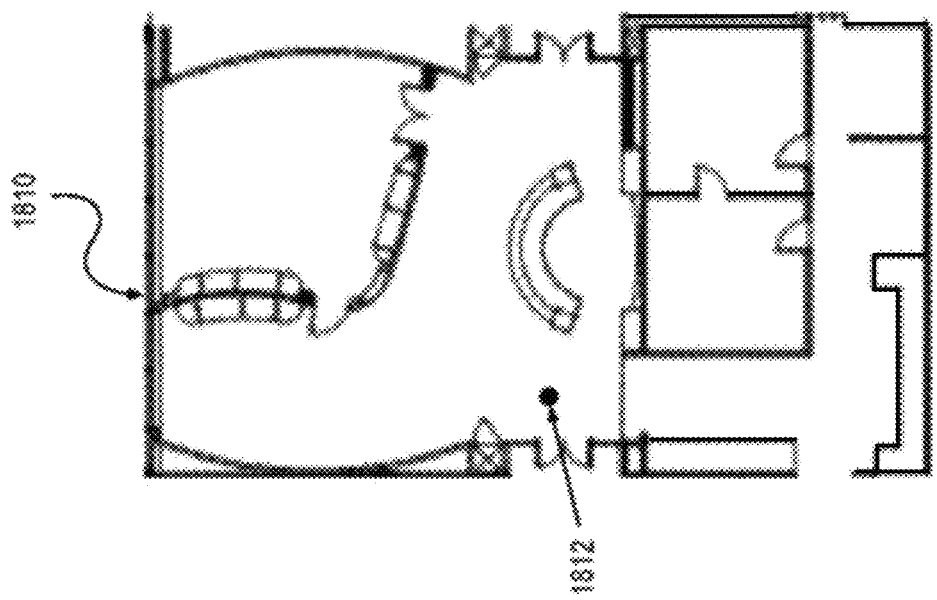

As shown at 1508, the logic 1500 can generate a 3D point cloud of each of the multiple parts. The 3D point cloud can be generated using one or more 3D point cloud generation techniques known in the art based on captured visual data. At 1510, the logic 1500 can correlate the 3D point cloud data with a two-dimensional (2D) map, such as a human-readable 2D map. FIG. 18 illustrates a screen shot 1820 of an exemplary 3D point cloud that can be correlated with a related portion of a 2D human readable map 1810. Using the correlation between the 3D point cloud and the 2D map, a transformation matrix can be generated that enables the logic 1500 to transform the positions of the estimated camera poses associated with the visual data of the structure into positions having 2D map coordinates, as shown at 1512. The logic 1500 can then train a CNN regression model using pairs of visual and camera pose data, as shown at 1514. The camera pose data is transformed camera pose data that has been transformed from a 3D point cloud position to a 2D map position (e.g., the 2D map coordinates of 1512). The CNN regression can then be used to predict coordinates of newly captured visual data within the 2D map, as shown at 1516.

Figure 16A:
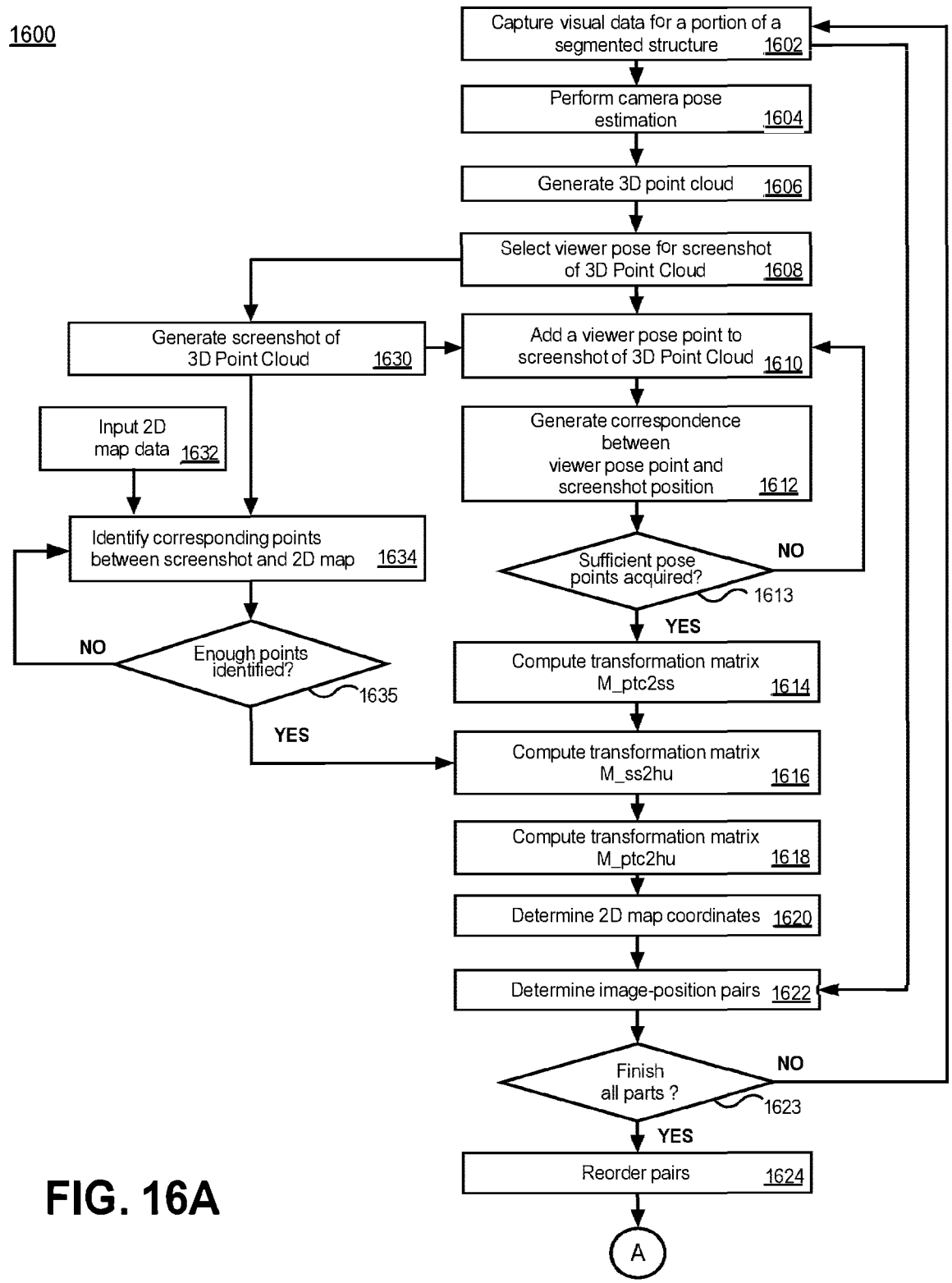
FIG. 16A-B is a flow diagram illustrating logic for of performing CNN regression re-localization for large structures, according to an embodiment.
Figure 16B:
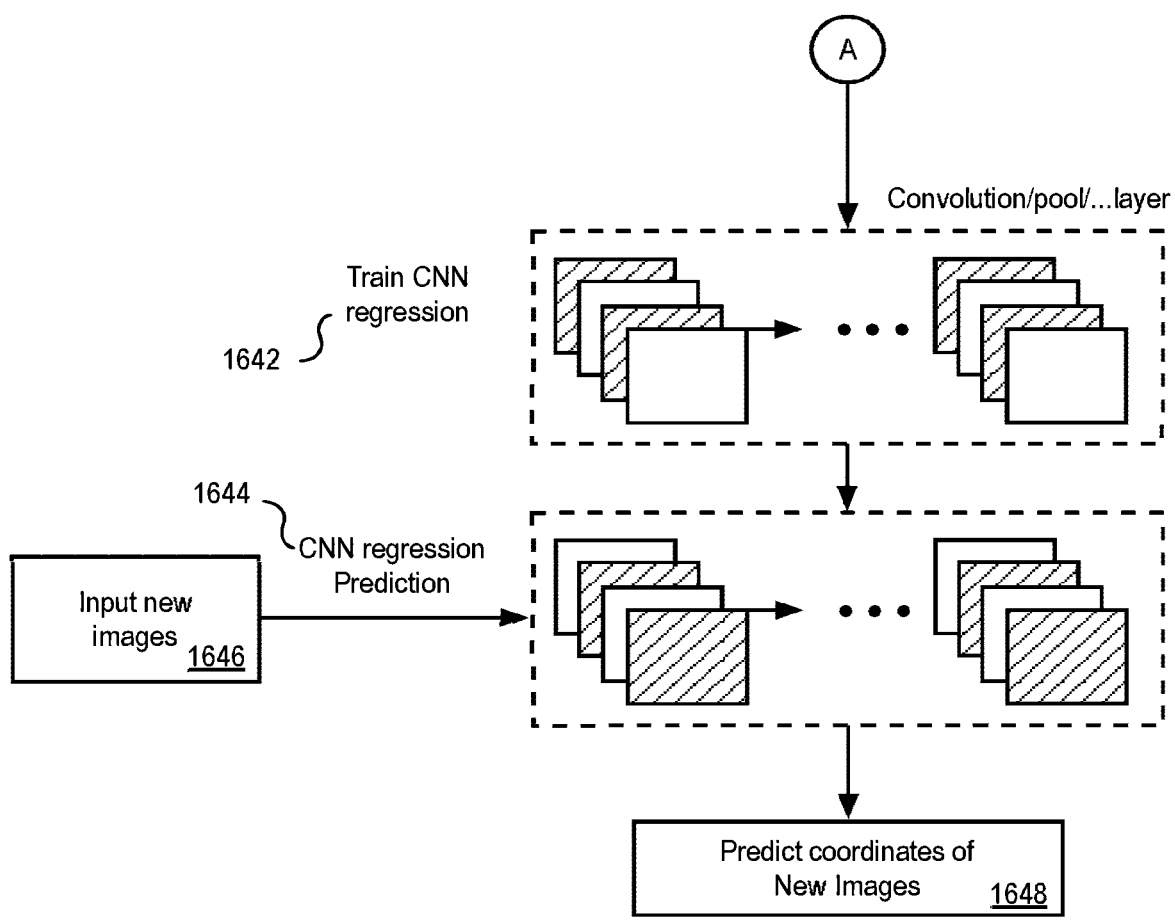

FIG. 16A-B is a flow diagram illustrating logic 1600 for performing CNN regression re-localization for large structures, according to an embodiment. Re-localization logic can be configured as software or firmware to manage the hardware to perform the image gathering, camera pose estimation, coordinate transformation, CNN regression training, and CNN regression prediction operations that are performed by embodiments described herein. In one embodiment the computational logic can be integrated into computational hardware such as a heterogeneous GPGPU processing system 100 as in FIG. 1.

FIG. 16A illustrates that operations for the logic 1600 include capturing visual data for a portion of a segmented structure, as shown at 1602. The segmented structure can be a human readable 2D map of a building, such as the building 1702 of FIG. 17. The map can be segmented into multiple parts, such as part 1704. The logic can designate the human readable map data as HM, with each of the multiple parts designated as ($P_i$, i=1, . . . , I). The visual data can include video or images and can be continuous data or, in one embodiment, include only key frame data. Various embodiments can be configured to use various types of image data, including but not limited to red-green-blue-depth (RGBD) data, binocular images, and monocular images.

For each of the multiple parts $P_i$, sufficient visual data (e.g., images ($Ima_{i,j}$ (j=1, . . . , J$^i$))) is captured at 1602 to enable camera pose estimation at 1604. The logic 1600 estimates poses of $Ima_{i,j}$ ($P_{i,j}$) using a visual SLAM technique, although the specifics of the pose estimation techniques can vary among embodiments. The type of visual data that is captured is related to the camera pose estimation technique that is used by the logic 1600, as differing camera pose estimation techniques may rely on specific types of input data. In one embodiment, monocular SLAM techniques can be performed on single images from which depth data cannot be derived. Where depth data is present in the image or binocular images are used, different camera pose estimation techniques may be employed. In one embodiment, if poses cannot be obtained for all images, only the images for which poses are obtained are used for further processed by the logic 1600.

As shown at 1606, the logic can generate a 3D point cloud ($PC_i$) based on the camera pose data. The 3D point cloud is a volumetric representation of the space in which localization and/or re-localization is to be enabled. The 3D point cloud can be generated using shape from motion techniques based on the six dimensional pose estimate and associated visual data, for example, using camera pose estimations and analysis of the spatial and temporal changes associated with a captured image sequence. The 3D point cloud $PC_i$ includes point cloud data for each of the multiple parts $P_i$ of the structure. Once the 3D point cloud $PC_i$ is generated, a viewer pose ($VP_i$) is selected for a screenshot of the 3D point cloud, as shown at 1608. The screenshot of the point cloud is a 2D cross section of the point cloud as viewed from the viewer pose $VP_i$. The viewer pose $VP_i$ is a pose from which the screenshot (e.g., cross section) of the 3D point cloud $PC_i$ is to be generated. In one embodiment the logic 1600 is configured to use known empirical data for a scene to determine a proper viewer pose for a screenshot. In one embodiment, a viewer pose for each segment may be explicitly selected via a human supervisor of the training process during supervised learning. The viewer pose to be selected is the pose from which a 2D screenshot generated from the 3D point cloud most corresponds with known 2D map; for example, of a human readable 2D map HM. An exemplary instance of viewer pose $VP_i$ is the pose associated with the screen shot 1820 of a 3D point cloud generated for the a part of the structure associated with the portion of the 2D human readable map 1810, each in FIG. 18.

Once the logic 1600 selects a viewer pose $VP_i$ for each point cloud $PC_i$ of each of the multiple parts $P_i$ of the structure at 1608, the logic can perform an operation to generate a screenshot for each of the 3D point clouds $PC_i$, as shown at 1630. The screen shot generation of the 3D point clouds can be performed in a parallel process or thread relative to other portions of the logic 1600. The generated screenshots at 1630 can then be supplied to an operation at 1610 that generates a mark on the screen shot to represent the viewer pose point for each screenshot. The mark added at 1610 can be a point color that is easily recognizable by the logic 1600, such as the point 1822 illustrated in the screenshot 1820 of FIG. 18. The logic 1600 can then generate a correspondence between the view pose point and screenshot position, as shown at 1612. The logic 1600 repeats operations at 1610 and 1620 until sufficient pose points are acquired, as determined at 1613. The pose points are imagepose pairs ($IPP_{i,k}$~($Ima_{i,k}$, $P_{i,k}$), k=1, . . . , $K_i$) that can be used to enable the computation of a point cloud to screen shot transformation matrix (M_ptc2ss) from a 3D pose position to a specific position within the 3D screenshot, as shown at 1614.

For each screenshot $SS_{i,k}$ output from 1610, a position $Mk_{i,k}$ in $SS_{i,k}$ is detected by methods such as, for example, intercepting by threshold and clustering for color values. The two dimensional coordinates of the point in $SS_{i,k}$ is $$PP_{i,k}\left(=\begin{bmatrix}x_{PP(i,k)}\\y_{PP(i,k)}\end{bmatrix}\right).$$

The two dimensional coordinates correspond to the horizontal motion of $$P_{i,k}\left(=\begin{bmatrix}u_{P1(i,k)}\\ \dots \\u_{P6(i,k)}\end{bmatrix}\right),$$

where $u_{Pt(i,k)}$, t=1 . . . 6 are respectively the left-right, up-down, forward-backward translation distances, and pitch, yaw and roll rotation angles) are extracted to form $$PH_{i,k}\left(=\begin{bmatrix}x_{PH(i,k)}\\y_{PH(i,k)}\end{bmatrix}=\begin{bmatrix}u_{P1(i,k)}\\u_{P3(i,k)}\end{bmatrix}\right).$$

The transformation matrix M_ptc2ss is obtained at 1614 by solving the equation $$\begin{bmatrix} x_{PP(i,k)} \\ y_{PP(i,k)} \end{bmatrix} = M_{ptc2ss} * \begin{bmatrix} x_{PH(i,k)} \\ y_{PH(i,k)} \end{bmatrix}$$

using least square method.

As shown at 1616, the logic 1600 can then generate a screen shot to human coordinate transformation matrix (M_ss2hu) that enables the translation of a screen shot position to a position in a human readable 2D map using 2D map data input at 1632. This transformation is based on a correlation of corresponding points between the screenshot of the 3D point cloud generated at 1630 and the 2D map data input at 1632. In one embodiment the logic 1600 can then identify corresponding points between the screenshots $SS_{i,k}$ and the input 2D map (e.g., human readable map data HM). In one embodiment, the correspondence between the 3D point cloud screenshots and the 2D map data is identified via the interaction of a supervisor of the logic 1600, and the logic 1600 receives the correspondence data as input at 1634. As shown at 1634, the logic 1600 continues to identify or receive identification of corresponding points of correlation between the screenshots $SS_{i,k}$ and the input 2D map data HM until enough points are identified, as determined at 1635, to enable the computation of a transformation matrix from screenshot position to human (e.g., 2D) map position at 1616.

As shown at 1616, the logic 1600 can use the accumulated data to generate the transformation matrix M_ss2hu. For $P_i$, the transformation matrix (M_ss2hu) from screenshot to HM is computed from the corresponding points identified at 1634. A set of points on the 2D map can be identified as $$HM\left( HMP_{i,s}\left( = \begin{bmatrix} x_{HMP(i,s)} \\ y_{HMP(i,s)} \end{bmatrix} \right), s = 1, \dots, S_i \right).$$

Points on the screenshots can be identified as $$SS_i\left( SSP_{i,s}\left( = \begin{bmatrix} x_{SSP(i,s)} \\ y_{SSP(i,s)} \end{bmatrix} \right) \right).$$

Using these points, the logic 1600 can compute M_ss2hu by solving the equation $$\begin{bmatrix} x_{HMP(i,k)} \\ y_{HMP(i,k)} \end{bmatrix} = M_{ss2hu} * \begin{bmatrix} x_{SSP(i,k)} \\ y_{SSP(i,k)} \end{bmatrix}$$

using least square method. As shown at 1618, the logic 1600 can compute a point cloud to human (e.g., 2D map) coordinate transformation matrix (M_ptc2hu) as $M_{ptc2hu} = M_{ss2hu} * M_{ptc2ss}$. Using transformation matrix M_ptc2hu, the logic 1600 can determine "new" 2D map coordinates based on "old" point cloud positions at 1620 using the equation Pnew=M_ptc2hu*Pold.

The logic 1600 can combine the 2D map coordinates determined at 1620 with the visual data captured at 1602 to determine image position pairs at 1622. The operations described above can be repeated for each of the multiple parts $P_i$ of the structure until the logic 1600 determines at 1623 that image-position pairs for all parts of the structure have been determined. The logic 1600 can then reorder the image-position pairs to list pairs at 1624. The image-position pairs:

$$\left( Ima_{i,j}, \begin{bmatrix} x_{HMP(i,j)} \\ 0 \\ y_{HMP(i,j)} \\ 0 \\ 0 \\ 0 \end{bmatrix} \left( \begin{bmatrix} x_{HMP(i,j)} \\ y_{HMP(i,j)} \end{bmatrix} = M_{ptc2hu} * \begin{bmatrix} x_{PH(i,j)} \\ y_{PH(i,j)} \end{bmatrix} \right) \right)$$

are reordered to list pairs $$\left( Ima_{i',j'}, \begin{bmatrix} x_{HMP(i',j')} \\ 0 \\ y_{HMP(i',j')} \\ 0 \\ 0 \\ 0 \end{bmatrix} \right).$$

The methods of reordering include but not limited to random reordering, extracting odd/even rows, and/or composition of the rows.

FIG. 16B illustrates training and prediction of a CNN regression model using the re-ordered image-position pairs. The image-position pairs $$\left( Ima_{i',j'}, \begin{bmatrix} x_{HMP(i',j')} \\ 0 \\ y_{HMP(i',j')} \\ 0 \\ 0 \\ 0 \end{bmatrix} \right)$$

output from 1624 of FIG. 16A are used to train CNN configured to perform regression (1642). The trained CNN can use a regression model to perform a re-localization prediction (1644) by providing new images for input (1646). CNN regression prediction (1644) can then be used to predict coordinates of the new images 1648. For a newly captured image, the position of the image on the 2D map HM is predicted by CNN regression (CNNR) result $$\begin{bmatrix} u_1 \\ \dots \\ u_6 \end{bmatrix} \text{ to be } \begin{bmatrix} x \\ y \end{bmatrix} = \begin{bmatrix} u_1 \\ u_3 \end{bmatrix}.$$

Figure 19:
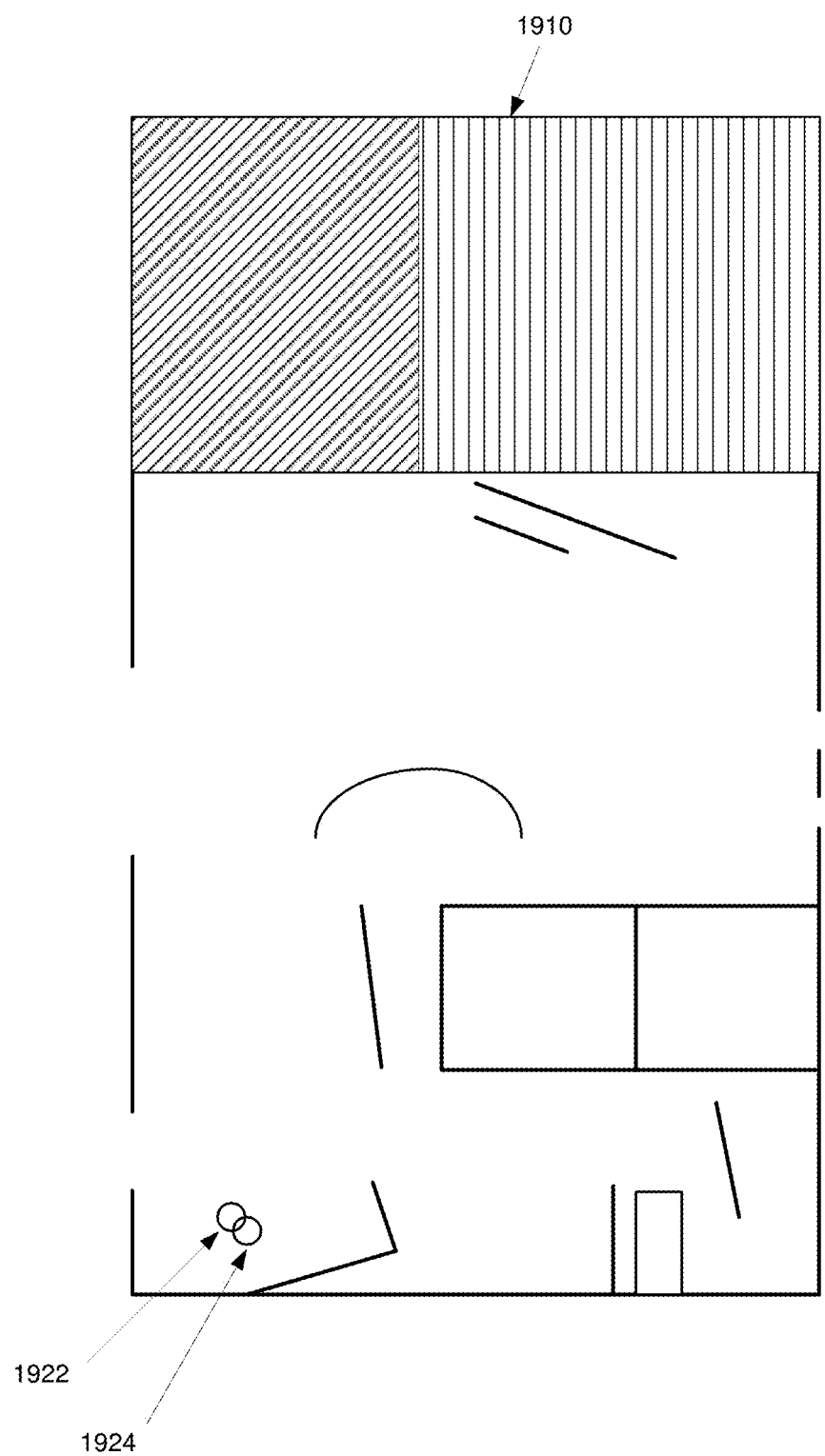
FIG. 19 illustrates localization within a structure relative to a reference location, according to an embodiment.

FIG. 19 is an illustration of a screenshot 1910 of a 3D point cloud of a structure showing a reference position 1922 in comparison with the predicted coordinates 1924 based on a new, untrained image. Experimental results applied to one embodiment revealed an average localization error of 1.9 meters within a total area of 600 m², although these results are exemplary and not limiting as to any particular embodiment.

Figure 20:
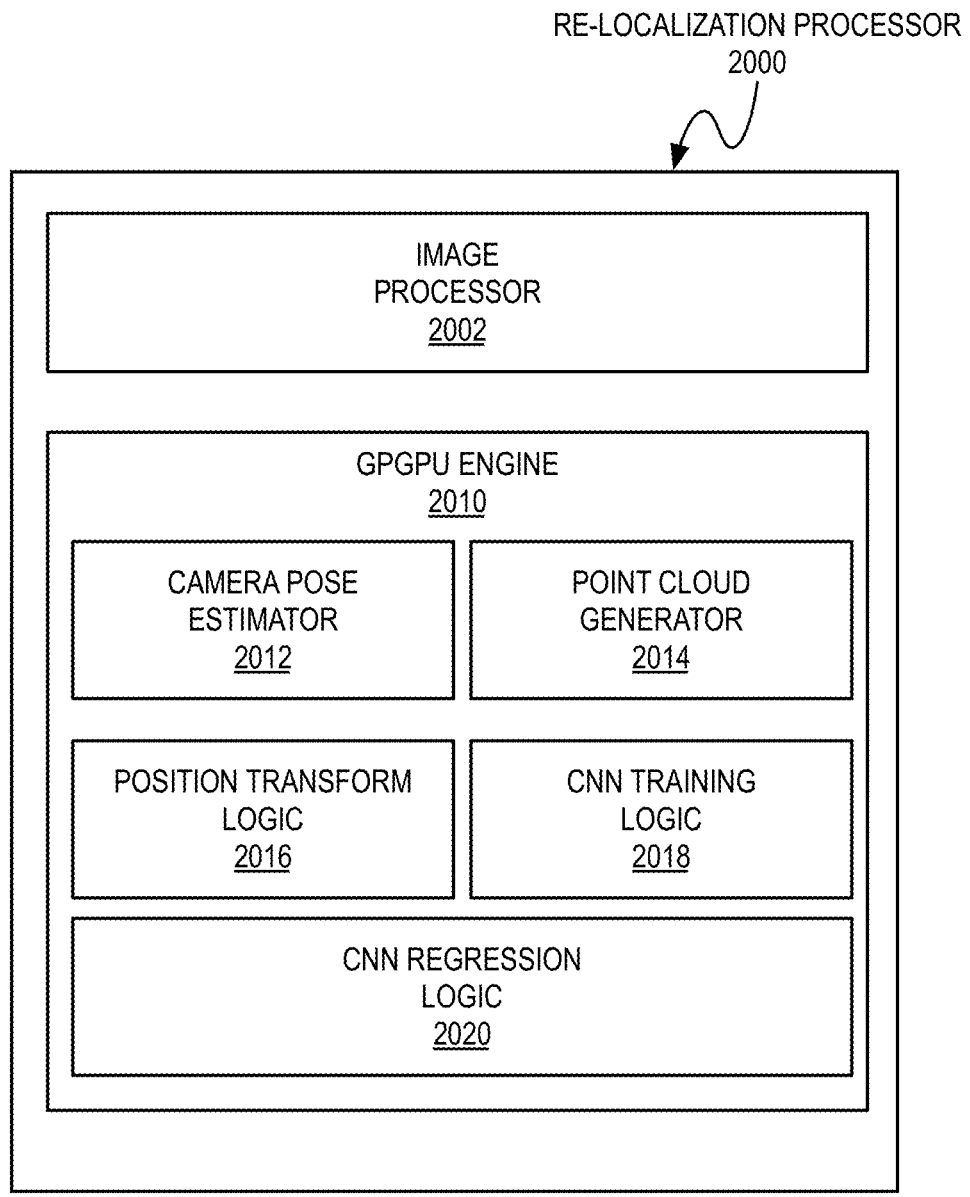
FIG. 20 illustrates a block diagram of a re-localization processor, according to an embodiment.

FIG. 20 illustrates a block diagram of a re-localization processor 2000, according to an embodiment. The re-localization processor 2000 is configured to perform and/or accelerate logic operations to perform CNN regression based re-localization and can be integrated within a data processing system as described herein.

In one embodiment the re-localization processor 2000 includes an image processor 2002 and a GPGPU engine 2010. The image processor is configured to process visual data received via a sensor. The sensor can be an image sensor such as a charge-coupled device (CCD) or complementary metal-oxide semiconductor (CMOS) sensor and can be configured to capture visual data in a still or video format. In one embodiment the image processor 2002 is configured to receive binocular data from multiple image sensors. In one embodiment the image processor 2002 is configured to process visual data having integrated depth data (e.g., RGBD data).

In one embodiment the image processor 2002 is coupled with a general purpose graphics processing unit (GPGPU) engine 2010 including execution logic configured to perform graphics processing and general purpose computational operations. The GPGPU engine 2010 includes fixed function logic as well as programmable execution logic such as the execution logic 600 illustrated in FIG. 6. The fixed function and programmable execution logic of the GPGPU engine 2010 can be configured to enable a camera pose estimator 2012, point cloud generator 2014, position transform logic 2016, CNN training logic 2018, and CNN regression logic 2020, which can each be a hardware logic unit such as an ASIC or FPGA, or can be a shader based logic module executed by programmable execution logic of the GPGPU engine 2010.

In one embodiment the camera pose estimator 2012 is configured to estimate a camera pose for a unit of visual data. The point cloud generator 2014 is configured to generate a point cloud based on a set of estimated camera poses. The position transformation logic 2016 is configured to transform a position within the 3D point cloud to a position within a 2D map of the location. The CNN training logic 2018 is configured to train the CNN to predict coordinates on the map for an image. The CNN training logic 2018 can train the CNN using an image and position pair, where the image includes the unit of visual data and the position is the position of the unit of visual data within the map of the location. The CNN regression logic 2020 can use the trained CNN model to perform re-location operations based on newly acquired visual data.

Figure 21:
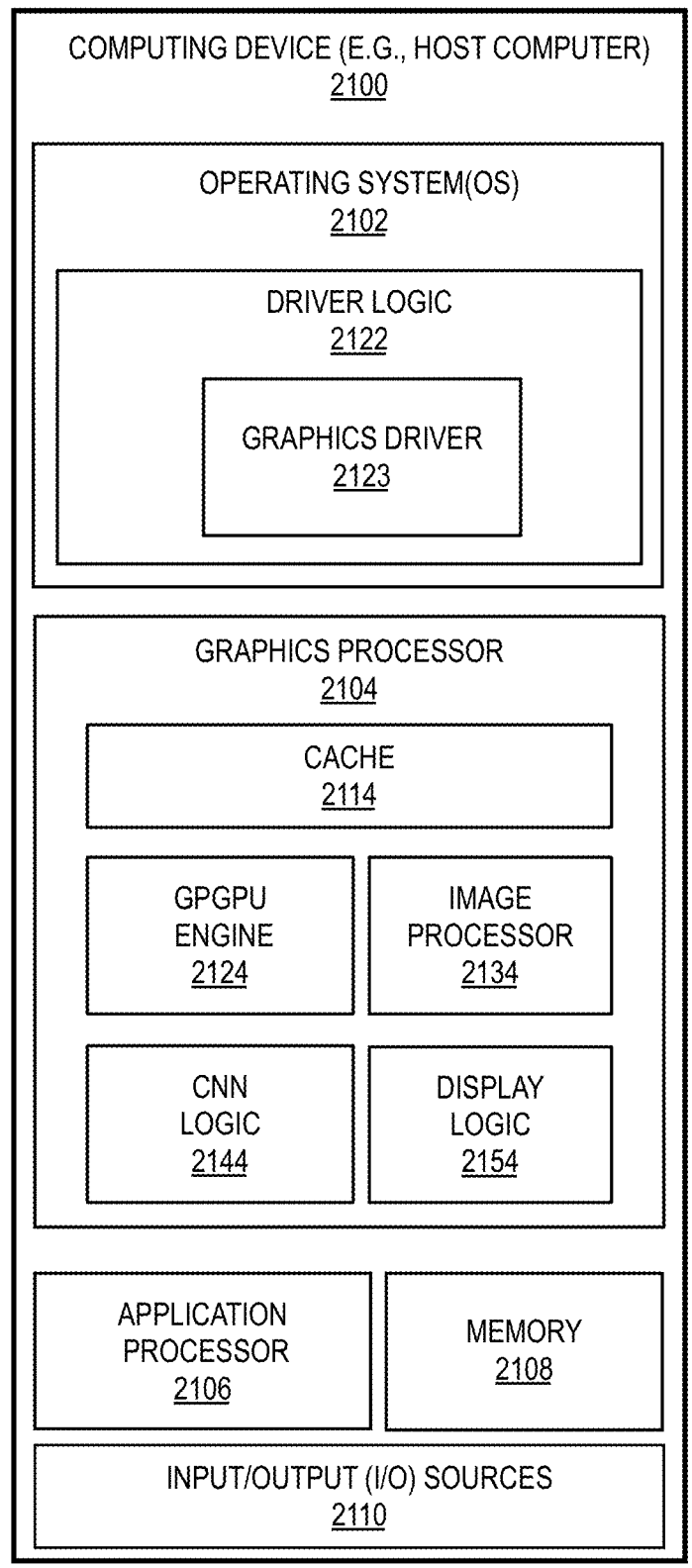
FIG. 21 is a block diagram of a computing device, according to an embodiment.

FIG. 21 is a block diagram of a computing device 2100 including a graphics processor 2104, according to an embodiment. The computing device 2100 can be a computing device such as the data processing system 100 as in of FIG. 1. The computing device 2100 may also be or be included within a communication device such as a set-top box (e.g., Internet-based cable television set-top boxes, etc.), global positioning system (GPS)-based devices, etc. The computing device 2100 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip.

The computing device 2100 includes a graphics processor 2104. The graphics processor 2104 represents any graphics processor described herein. The graphics processor includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics and image resources.

In one embodiment the graphics processor 2104 includes a cache 2114, which can be a single cache or divided into multiple segments of cache memory, including but not limited to any number of L1, L2, L3, or L4 caches, render caches, depth caches, sampler caches, and/or shader unit caches.

In one embodiment the graphics processor 2104 can be configured as a re-location processor 2000 as in FIG. 20. In such embodiment the graphic processor 2104 includes a GPGPU engine 2124, an image processor 2134, CNN logic 2144, and display logic 2154. The GPGPU engine 2124 and image processor 2134 can be variants of the GPGPU engine 2010 and image processor 2002 of FIG. 20. The CNN logic 2114 can include the CNN training logic 2018 and the CNN regression logic 2020 of FIG. 20. The display logic 2154 can be configured to output location and/or mapping data to a display coupled to or integrated within the computing device 2100. The image processor 2134, in one embodiment, is additionally configured to process newly captured images from an image sensor or camera device and perform re-localization operations using the newly captured images via the CNN logic 2144.

As illustrated, in one embodiment, and in addition to the graphics processor 2104, the computing device 2100 may further include any number and type of hardware components and/or software components, including, but not limited to an application processor 2106, memory 2108, and input/output (I/O) sources 2110. The application processor 2106 can interact with a hardware graphics pipeline, as illustrated with reference to FIG. 3, to share graphics pipeline functionality. Processed data is stored in a buffer in the hardware graphics pipeline and state information is stored in memory 2108. The resulting data can be transferred to a display controller (e.g., display logic 2154) for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2106 can include one or processors, such as processor(s) 102 of FIG. 1, and may be the central processing unit (CPU) that is used at least in part to execute an operating system (OS) 2102 for the computing device 2100. The OS 2102 can serve as an interface between hardware and/or physical resources of the computing device 2100 and one or more users. The OS 2102 can include driver logic 2122 for various hardware devices in the computing device 2100. The driver logic 2122 can include graphics driver logic 2123 such as the user mode graphics driver 1026 and/or kernel mode graphics driver 1029 of FIG. 10.

It is contemplated that in some embodiments the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random access memory (RAM) (e.g., SDRAM, SRAM, etc.) comprising an application that makes use of the graphics processor 2104 to render a desktop or 3D graphics scene. A memory controller hub, such as memory controller hub 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2100 may be employed to observe gestures, record audio and video and to receive and transmit visual and audio commands.

I/O sources 2110 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2100 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Embodiments described herein provide a processing apparatus comprising compute logic to train a convolutional neural network (CNN) to perform autonomous re-localization for a service robot or mobile device. In one embodiment the apparatus comprises an image processor to process visual data received via a sensor and a general purpose graphics processing engine perform camera pose estimation for image data and generate a transformation matrix to transform positions of camera pose estimations to positions within a human readable map of the location. The images and transformed positions are uses to train the CNN to perform re-localization.

One embodiment provides a processing apparatus to configure a convolutional neural network (CNN) to perform autonomous re-localization within a structure. The processing apparatus comprises an image processor to process visual data received via a sensor and a general purpose graphics processing engine. In one embodiment the general purpose graphics processing engine includes a camera pose estimator to estimate a camera pose for a unit of visual data; a point cloud generator to generate a point cloud based on a set of estimated camera poses; position transformation logic to transform a position within the point cloud to a position within a map of the structure; and CNN training logic to train the CNN to predict coordinates on the map for an image, the CNN training logic to train the CNN using an image and position pair, wherein the image includes the unit of visual data and the position includes the position of the unit of visual data within the map of the structure.

One embodiment provides a data processing system comprising a storage device to store data for convolutional neural network (CNN) configured to perform regression based re-localization for a structure; a display device to display results of the re-localization; and a re-localization processor including CNN regression logic to perform regression based re-localization, wherein the CNN regression logic is trained via CNN training logic configured to train the CNN to predict coordinates on a map of the structure for an image, wherein the CNN training logic is trained using a set of image and position pairs, wherein the image includes a unit of visual data for the structure and the position includes the position of the unit of visual data within the map of the structure.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
a memory and
at least one processor configured to perform instructions stored in the memory, that cause the at least one processor to:
generate a three-dimensional point cloud based on a set of estimated physical positions of at least one camera within a structure and orientations of the at least one camera within the structure;
transform a position within the point cloud to a position within a two-dimensional map; and
train a convolutional neural network (CNN) to predict coordinates on the map for an object based on image and position pairs associated with at least one camera.

2. The apparatus as in claim 1, wherein performance of the instructions stored in the memory cause the at least one processor to estimate a physical position of the at least one camera and orientation of the at least one camera via simultaneous location and mapping.

3. The apparatus as in claim 2, comprising an image processor, wherein the image processor is configured to derive depth data from visual data from the at least one camera.

4. The apparatus as in claim 1, wherein performance of the instructions stored in the memory cause the at least one processor to generate a cross sectional view of the point cloud from a viewer position.

5. The apparatus as in claim 4, wherein performance of the instructions stored in the memory cause the at least one processor to:
generate a first transformation matrix to transform a coordinate associated with a position within the point cloud to a coordinate within the cross sectional view of the point cloud;
generate a second transformation matrix to transform the coordinate within the cross sectional view of the point cloud to a coordinate associated with the position within the map; and
generate a third transformation matrix to transform the coordinate associated with the position within the point cloud to the coordinate associated with the position within the map, the third transformation matrix generated from the first transformation matrix and the second transformation matrix.

6. The apparatus as in claim 1, wherein performance of the instructions stored in the memory cause the at least one processor to reorder the image and position pairs, wherein to reorder the image and position pairs includes one or more of: a random reordering, odd/even row extraction, or composition of rows.

7. The apparatus as in claim 1, including CNN regression circuitry to perform regression based re-localization.

8. The apparatus of claim 1, wherein:
the map comprises a map of the structure and
the image and position pairs are gathered by the at least one camera on a machine as the machine traverses the structure.

9. The apparatus of claim 1, wherein the CNN is to predict coordinates on the map for the object in response to re-location of the object.

10. A method comprising:
gathering visual data of an interior of a structure;
constructing a three-dimensional (3D) point cloud of the interior of the structure based on a set of estimated physical positions of at least one camera within the structure and orientation of the at least one camera within the structure;
correlating the 3D point cloud with a two-dimensional (2D) map of the interior of the structure;
transforming positions of point cloud into positions on the 2D map of the interior of the structure; and
training a convolutional neural network (CNN) regression model to predict coordinates on the 2D map for an object based on image and position data.

11. The method as in claim 10, comprising deriving depth data for the interior of the structure from visual data from the at least one camera.

12. The method as in claim 11, wherein the visual data includes video data or still image data of the interior of the structure.

13. The method as in claim 10, wherein transforming positions of point cloud into positions on the map of the interior of the structure includes computing a transformation matrix to transform positions of point cloud to coordinates within the 2D map of the interior of the structure.

14. The method as in claim 10, comprising performing object re-localization via the CNN regression model using visual data.

15. A data processing system comprising:
a memory device to store data for a convolutional neural network (CNN) configured to perform regression based re-localization of an object within a structure; and
at least one processor including circuitry to perform regression based re-localization and output re-location data for the object, wherein the circuitry is to train the CNN to predict coordinates on a map of the structure for the object, wherein the circuitry is trained using a set of image and position pairs.

16. The data processing system as in claim 15, wherein to train the CNN to predict coordinates on the map for the object, the circuitry is to:
process visual data received via a sensor;
generate a three-dimensional point cloud based on a set of estimated physical positions of at least one camera within a structure and orientations of the at least one camera within the structure;

transform a position within the point cloud to a position within the map of the structure; and generate data pairs to train the circuitry.

17. The data processing system as in claim 16, wherein the circuitry is further to process data derived from simultaneous location and mapping (SLAM) to estimate physical positions of at least one camera within a structure and orientations of the at least one camera within the structure.

18. The data processing system as in claim 17, wherein the circuitry is to couple with an image processor configured to derive depth data from visual data received via the sensor.

19. The data processing system as in claim 18, wherein to transform a position within the point cloud to a position within the map of the structure, the circuitry is to:

compute a first transformation matrix to transform a coordinate associated with a position within the point cloud to a coordinate within a cross sectional view of the point cloud, wherein the cross sectional view of the point cloud comprises a cross section of the point cloud from a selected viewer position;

compute a second transformation matrix to transform the coordinate within the cross sectional view of the point cloud to a coordinate associated with the position within the map of the structure; and compute a third transformation matrix to transform the coordinate associated with the position within the point cloud to the coordinate associated with the position within the map of the structure, the third transformation matrix computed from the first transformation matrix and the second transformation matrix.

20. The data processing system as in claim 19, wherein the point cloud comprises a three-dimensional (3D) point cloud based on a set of estimated camera poses.

21. At least one non-transitory computer-readable medium comprising instructions stored thereon, that if executed by one or more processors, cause the one or more processors to:

utilize a convolutional neural network (CNN) to perform re-localization to predict coordinates on a map of a structure for an object, wherein the CNN is trained based on image and position pairs associated with at least one camera and wherein the utilize the CNN to perform re-localization to predict coordinates on a map of a structure for an object comprises:

process visual data received via a sensor, generate a three-dimensional point cloud based on a set of estimated physical positions of at least one camera within a structure and orientations of the at least one camera within the structure, transform a position within the point cloud to a position within the map of the structure, and generate data pairs to train the CNN.

22. The at least one non-transitory computer-readable medium of claim 21, wherein to transform a position within the point cloud to a position within the map of the structure comprises:

compute a first transformation matrix to transform a coordinate associated with a position within the point cloud to a coordinate within a cross sectional view of the point cloud, wherein the cross sectional view of the point cloud comprises a cross section of the point cloud from a selected viewer position;

compute a second transformation matrix to transform the coordinate within the cross sectional view of the point cloud to a coordinate associated with the position within the map of the structure; and compute a third transformation matrix to transform the coordinate associated with the position within the point cloud to the coordinate associated with the position within the map of the structure, the third transformation matrix computed from the first transformation matrix and the second transformation matrix.

* * * * *